United States Patent
Imai

(10) Patent No.: US 12,403,640 B2
(45) Date of Patent: Sep. 2, 2025

(54) PLASTICIZING DEVICE, INJECTION MOLDING DEVICE, AND THREE-DIMENSIONAL SHAPING DEVICE

(71) Applicant: SEIKO EPSON CORPORATION, Tokyo (JP)

(72) Inventor: Yuki Imai, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 139 days.

(21) Appl. No.: 18/324,190

(22) Filed: May 26, 2023

(65) Prior Publication Data
US 2023/0382031 A1    Nov. 30, 2023

(30) Foreign Application Priority Data
May 30, 2022    (JP) .................................. 2022-087518

(51) Int. Cl.
  B29C 45/47    (2006.01)
  B29C 45/60    (2006.01)
  B29C 45/74    (2006.01)

(52) U.S. Cl.
  CPC .............. B29C 45/47 (2013.01); B29C 45/60 (2013.01); B29C 45/74 (2013.01)

(58) Field of Classification Search
  CPC .......... B29C 45/47; B29C 45/74; B29C 45/60
  See application file for complete search history.

(56) References Cited

U.S. PATENT DOCUMENTS

| | | | | |
|---|---|---|---|---|
| 4,183,448 | A | * | 1/1980 | Nash ....................... B29C 48/92 222/413 |
| 9,090,035 | B2 | * | 7/2015 | De Beer ............ B29D 99/0096 |
| 2018/0311894 | A1 | * | 11/2018 | Saito ....................... B29C 64/40 |
| 2019/0358903 | A1 | * | 11/2019 | Watanabe ............... B22F 10/22 |

(Continued)

FOREIGN PATENT DOCUMENTS

| | | | | |
|---|---|---|---|---|
| JP | 0929800 | A | * 2/1997 | ............. B29C 45/48 |
| JP | 09131775 | A | * 5/1997 | ........... B29C 45/541 |
| JP | 2010241016 | A | 10/2010 | |

(Continued)

OTHER PUBLICATIONS

Machine translation JPH09131775A (Year: 1997).*

(Continued)

*Primary Examiner* — Abbas Rashid
*Assistant Examiner* — Wayne K. Swier
(74) *Attorney, Agent, or Firm* — Harness, Dickey & Pierce, P.L.C.

(57) ABSTRACT

A plasticizing device includes: a rotary body having a groove forming surface in which a groove is formed and having a screw configured to rotate; a barrel having a facing surface facing the groove forming surface and having a communication hole through which a plasticized material flows out to an outside; a heating unit configured to heat the material supplied to the groove; a screw case accommodating the screw; and a biasing portion configured to bias the rotary body from the screw case toward the rotary body and having a rotary member having a hardness lower than that of (Continued)

the rotary body at a tip end, or a sealing portion configured to seal a fluid in a space between the screw case and the rotary body.

7 Claims, 18 Drawing Sheets

(56) References Cited

U.S. PATENT DOCUMENTS

2020/0307091 A1* 10/2020 Kobayashi ............ B29C 64/118
2022/0055274 A1    2/2022 Maruyama et al.

FOREIGN PATENT DOCUMENTS

JP    2020075396 A  *  5/2020  ............ B29B 7/429
JP    2022034721 A      3/2022

OTHER PUBLICATIONS

Machine translation JPH0929800A (Year: 1997).*
Machine translation JP2020075396A (Year: 2020).*
Machine translation JP2010241016A (Year: 2010).*

* cited by examiner

FIG. 9

| FIRST DISTANCE D1 (mm) (ENVIRONMENTAL TEMPERATURE 25°C) | SET TEMPERATURE (°C) | | | | |
|---|---|---|---|---|---|
| | 100 | 200 | 300 | 400 | 430 |
| 0.30 | B | B | B | A | A |
| 0.25 | B | A | A | A | A |
| 0.20 | A | A | A | A | A |
| 0.15 | A | A | A | A | A |
| 0.10 | A | A | A | C | C |

PLASTICIZING DEVICE, INJECTION MOLDING DEVICE, AND THREE-DIMENSIONAL SHAPING DEVICE

The present application is based on, and claims priority from JP Application Serial Number 2022-087518, filed May 30, 2022, the disclosure of which is hereby incorporated by reference herein in its entirety.

BACKGROUND

1. Technical Field

The present disclosure relates to a plasticizing device, an injection molding device, and a three-dimensional shaping device.

2. Related Art

JP-A-2010-241016 discloses a plasticizing delivery device including a rotor accommodated in a casing and formed with spiral grooves, and a barrel in contact with an end surface of the rotor and having a communication hole at a center.

As in JP-A-2010-241016, when a rotary body such as the rotor rotates within the casing, a clearance between the casing and the rotary body may change due to thermal expansion. When the clearance between the casing and the rotary body is narrowed, there is a possibility that the casing and the rotary body come into contact with each other and generate an abnormal sound. Further, when the clearance is widened, there is a possibility that the abnormal sound is generated due to axial vibration of the rotary body.

SUMMARY

According to a first aspect of the present disclosure, a plasticizing device is provided. The plasticizing device includes: a rotary body having a groove forming surface in which a groove is formed and having a screw configured to rotate; a barrel having a facing surface facing the groove forming surface and having a communication hole through which a plasticized material flows out to an outside; a heating unit configured to heat the material supplied to the groove; a screw case accommodating the screw; and a biasing portion configured to bias the rotary body from the screw case toward the rotary body and having a rotary member having a hardness lower than that of the rotary body at a tip end, or a sealing portion configured to seal a fluid in a space between the screw case and the rotary body.

According to a second aspect of the present disclosure, a plasticizing device is provided. The plasticizing device includes: a rotary body having a groove forming surface in which a groove is formed and having a screw configured to rotate; a barrel having a facing surface facing the groove forming surface and having a communication hole through which a plasticized material flows out to an outside; a heating unit configured to heat the material supplied to the groove; and a screw case accommodating the screw, in which the rotary body includes a first regulating portion having a first contact surface facing a barrel side, the screw case includes a second regulating portion facing the first contact surface and having a second contact surface contactable with the first contact surface, and an interval between the first contact surface and the second contact surface is 0.15 mm or more and 0.25 mm or less at an environmental temperature of 25° C.

A third aspect of the present disclosure is an injection molding device including the plasticizing device of the aspect described above and a nozzle configured to inject the plasticized material flowing out of the communication hole into a mold.

A fourth aspect of the present disclosure is a three-dimensional shaping device including the plasticizing device of the aspect described above and a nozzle configured to discharge the plasticized material flowing out of the communication hole toward a shaping table.

BRIEF DESCRIPTION OF THE DRAWINGS

FIG. 9 is a diagram showing experimental results for an optimum value of a first distance.

DESCRIPTION OF EXEMPLARY EMBODIMENTS

A. First Embodiment

Figure 1:
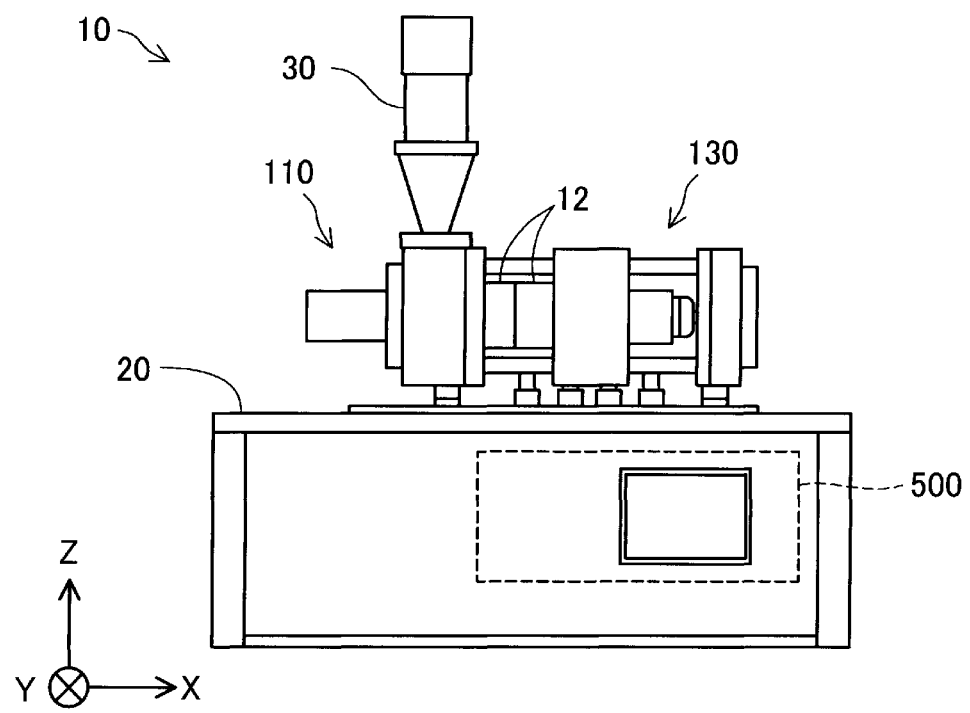
FIG. 1 is a front view showing a schematic configuration of an injection molding device according to a first embodiment.

FIG. 1 is a front view showing a schematic configuration of an injection molding device 10 according to a first embodiment. In FIG. 1, arrows indicating X, Y, and Z directions orthogonal to one another are shown. The X direction and the Y direction are directions parallel to a horizontal plane, and the Z direction is a direction opposite to a gravity direction. The X, Y, and Z directions shown in FIG. 2 and subsequent figures correspond to the X, Y, and Z directions shown in FIG. 1. In the following description, when a direction is identified, "+" indicates a positive direction that is a direction indicated by an arrow, "−" indicates a negative direction that is a direction opposite to the direction indicated by an arrow, and positive and negative symbols are used together to indicate directions.

The injection molding device 10 includes a plasticizing device 110, and a mold clamping device 130. The plasticizing device 110 and the mold clamping device 130 are fixed to a base 20, respectively. The base 20 is provided with a control unit 500. The injection molding device 10 injects a plasticized material from the plasticizing device 110 into a mold 12 mounted on the mold clamping device 130 to form a molded product. In the embodiment, the metal mold 12 is mounted on the mold clamping device 130. The mold 12 mounted on the mold clamping device 130 is not limited to being made of metal, and may be made of resin or ceramic. The metal mold 12 is referred to as a mold.

A hopper 30 into which a material of the molded product is charged is coupled to the plasticizing device 110. As the material of the molded product, for example, a thermoplastic resin formed in a pellet shape is used.

The plasticizing device 110 plasticizes at least a part of the material supplied from the hopper 30 to generate the plasticized material, and injects the plasticized material into the mold 12 mounted on the mold clamping device 130. In the present specification, "plasticization" is a concept including melting, and refers to changing from a solid state to a state of presenting fluidity. Specifically, in a case of a material in which glass transition occurs, the plasticization refers to setting a temperature of the material to be equal to or higher than a glass transition point. In a case of a material in which no glass transition occurs, the plasticization refers to setting the temperature of the material to be equal to or higher than a melting point.

The control unit 500 is implemented by a computer including one or a plurality of processors, a main storage device, and an input and output interface through which signals are input and output from and to an outside. When the processor reads and executes a program on the main storage device, the control unit 500 controls the plasticizing device 110 and the mold clamping device 130 and manufactures the molded product.

Figure 2:
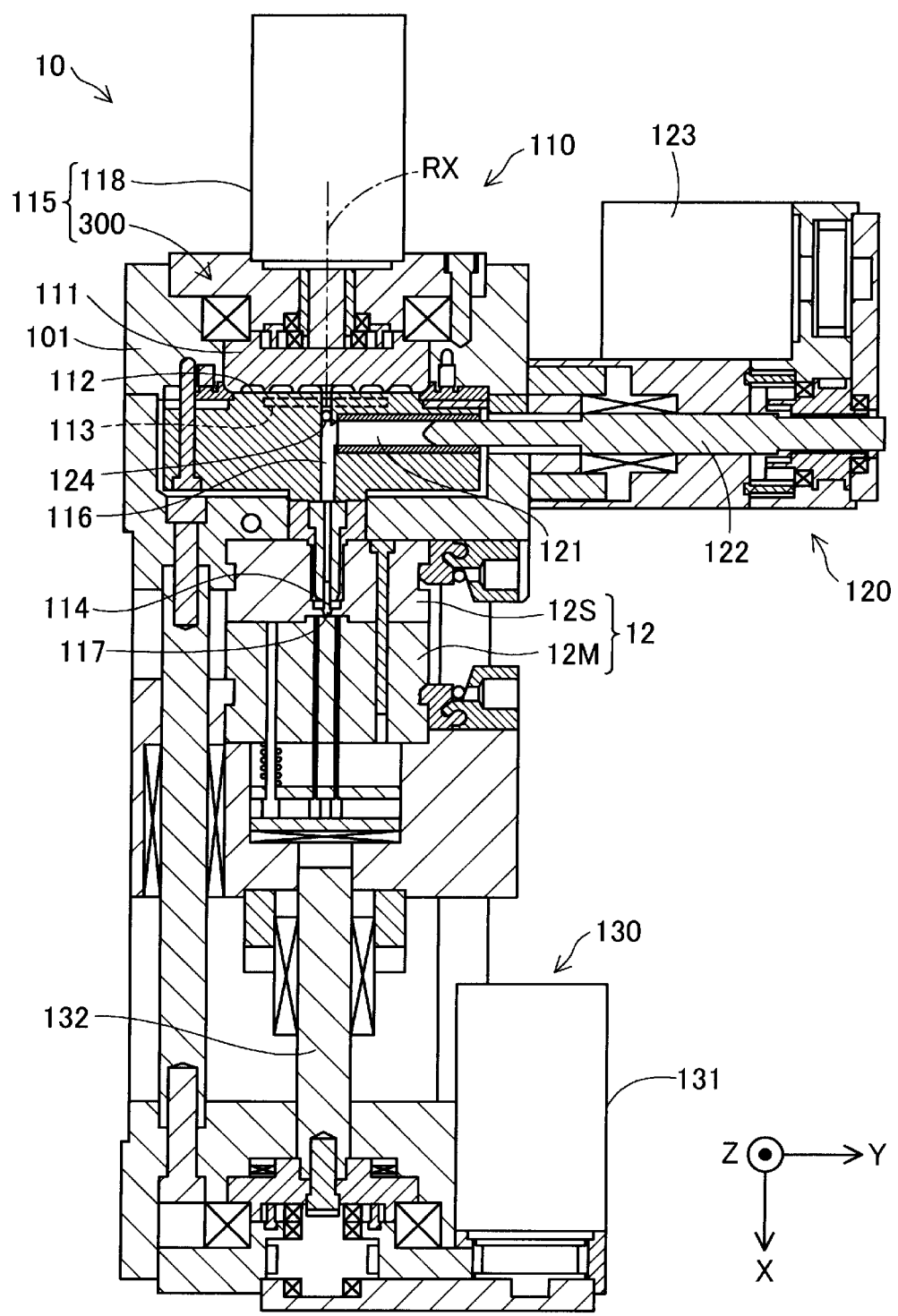
FIG. 2 is a cross-sectional view showing the schematic configuration of the injection molding device.

FIG. 2 is a cross-sectional view showing a schematic configuration of the injection molding device 10. As described above, the injection molding device 10 includes the plasticizing device 110, the mold clamping device 130, and the mold 12, and also includes an injection control mechanism 120.

The plasticizing device 110 includes a screw 111, a barrel 112, a heater 113, and a nozzle 114.

The screw 111 is accommodated in a screw case 101 that accommodates the screw 111. The screw 111 is also referred to as a rotor, a scroll, or a flat screw. The screw 111 is rotationally driven in the screw case 101 around a rotation axis RX by a screw driving unit 115 including a driving motor 118 and a speed reducer 300. In the embodiment, the X direction is a direction along the rotation axis RX. A communication hole 116 is formed at a center of the barrel 112. An injection cylinder 121 and the nozzle 114, which will be described later, are coupled to the communication hole 116. The communication hole 116 is provided with a check valve 124 upstream of the injection cylinder 121. The rotation of the screw 111 driven by the screw driving unit 115 and heating performed by the heater 113 are controlled by the control unit 500.

Figure 3:
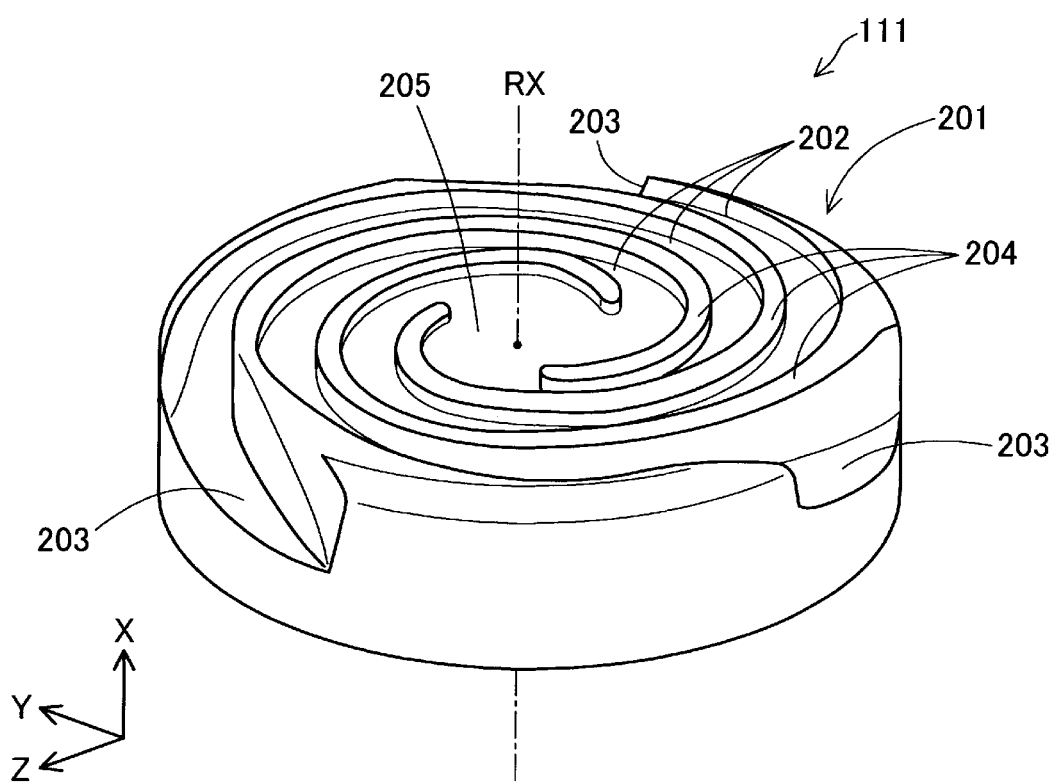
FIG. 3 is a perspective view showing a schematic configuration of a screw.

FIG. 3 is a perspective view showing a schematic configuration of the screw 111. The screw 111 has a substantially cylindrical shape in which a length in a direction along a center axis of the screw 111 is smaller than a length in a direction perpendicular to the center axis. On a groove forming surface 201 of the screw 111 facing the barrel 112, spiral grooves 202 are formed around a center portion 205. The groove 202 communicates with a material inlet 203 formed in a side surface of the screw 111. The material supplied from the hopper 30 is supplied to the groove 202 through the material inlet 203. The grooves 202 are formed by being separated by ridge portions 204. FIG. 3 shows an example in which three grooves 202 are formed, but the number of grooves 202 may be one, or may be two or more. A shape of the groove 202 is not limited to a spiral shape, may be a helical shape or an involute curve shape, or may be a shape extending in a manner of drawing an arc from the center portion toward an outer periphery.

Figure 4:
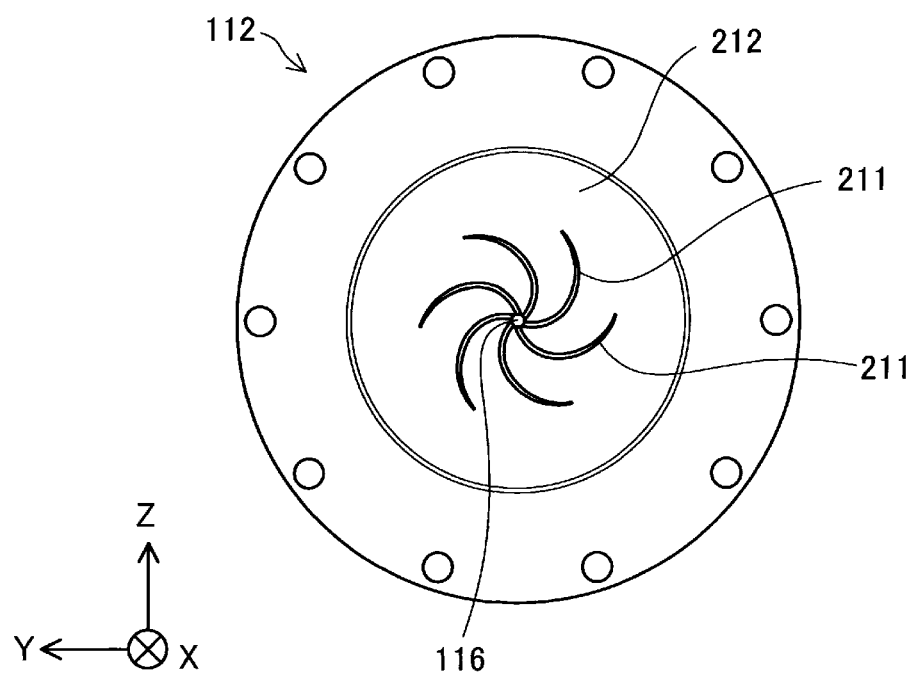
FIG. 4 is a schematic plan view of a barrel.

FIG. 4 is a schematic plan view of the barrel 112. The barrel 112 has a facing surface 212 facing the groove forming surface 201 of the screw 111. The communication hole 116 through which the plasticized material flows out to an outside is formed in a center of the facing surface 212. A plurality of guide grooves 211 coupled to the communication hole 116 and extending in a spiral shape from the communication hole 116 toward the outer periphery are formed in the facing surface 212. The material supplied to the grooves 202 of the screw 111 flows along the grooves 202 and the guide grooves 211 by the rotation of the screw 111, and is guided to the center portion 205 of the screw 111 while being plasticized between the screw 111 and the barrel 112 by the rotation of the screw 111 and the heating of the heater 113. The material flowing into the center portion 205 is guided from the communication hole 116 provided at the center of the barrel 112 to the injection control mechanism 120. The guide grooves 211 may not be provided in the barrel 112. A temperature of the heater 113 is set in a range of 25° C. to 430° C. according to a type of the material by the control unit 500.

As shown in FIG. 2, the injection control mechanism 120 includes the injection cylinder 121, a plunger 122, and a plunger driving unit 123. The injection control mechanism 120 has a function of injecting the plasticized material in the injection cylinder 121 into a cavity 117 to be described later. The injection control mechanism 120 controls an injection amount of the plasticized material from the nozzle 114 under the control of the control unit 500. The injection cylinder 121 is a substantially cylindrical member coupled to the communication hole 116 of the barrel 112, and includes the plunger 122 therein. The plunger 122 slides inside the injection cylinder 121 and pumps the plasticized material in the injection cylinder 121 to the nozzle 114 included in the plasticizing device 110. The plunger 122 is driven by the plunger driving unit 123 including a motor. The injection cylinder 121 may be coupled to a flow path downstream of the communication hole 116.

The mold 12 includes a movable mold 12M and a fixed mold 12S. The movable mold 12M and the fixed mold 12S face each other, and the cavity 117, which is a space corresponding to a shape of the molded product, is provided therebetween. The plasticized material flowing out of the communication hole 116 of the barrel 112 is pumped by the injection control mechanism 120 and injected from the nozzle 114 into the cavity 117.

The mold clamping device 130 includes a mold driving unit 131, and has a function of opening and closing the movable mold 12M and the fixed mold 12S. Under control of the control unit 500, the mold clamping device 130 causes a ball screw 132 to rotate by driving the mold driving unit 131 including a motor, and causes the movable mold 12M joined to the ball screw 132 to move with respect to the fixed mold 12S, thereby opening and closing the mold 12. That is, the fixed mold 12S is stationary in the injection molding device 10, and the movable mold 12M moves with respect to the stationary fixed mold 12S to open and close the mold 12.

Figure 5:
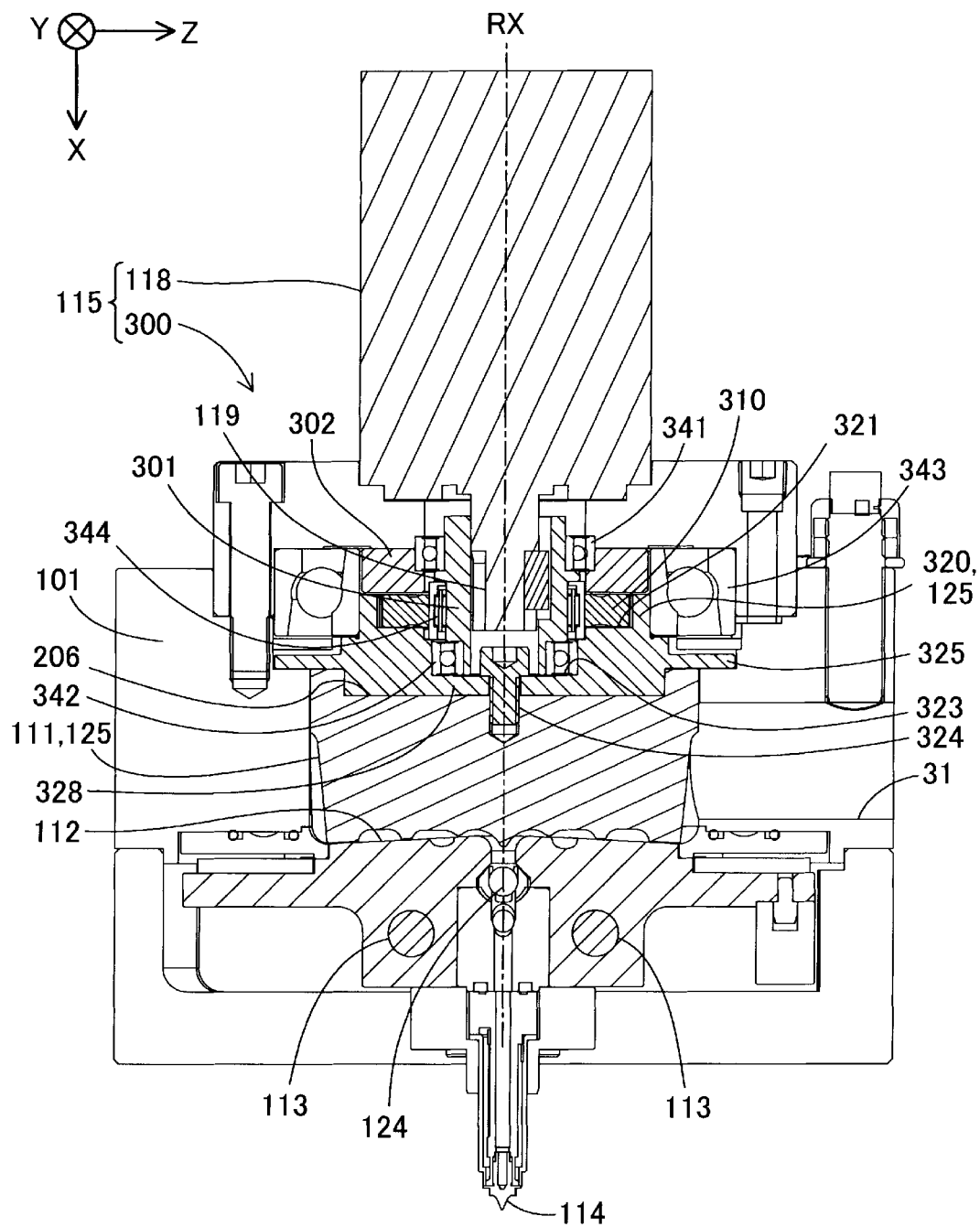
FIG. 5 is a cross-sectional view showing a structure of a speed reducer.
Figure 6:
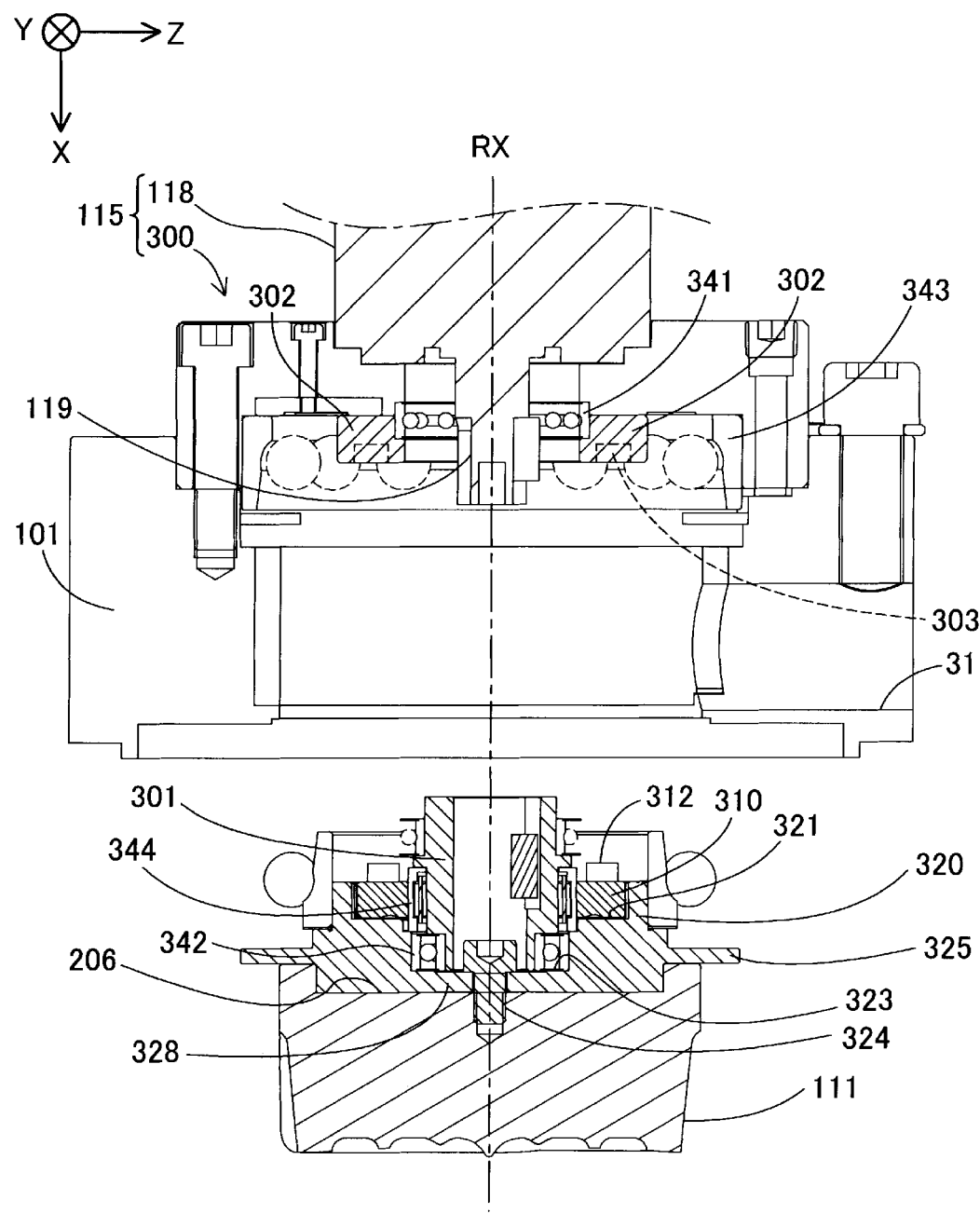
FIG. 6 is an exploded cross-sectional view showing a part of the speed reducer.
Figure 7:
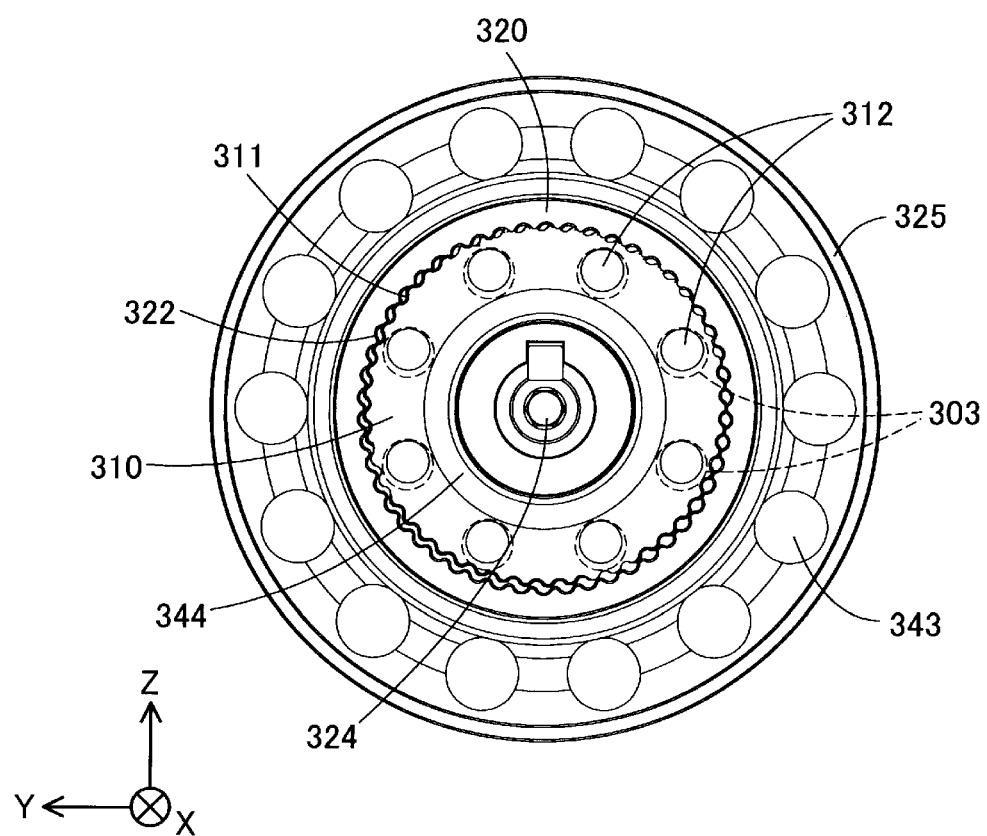
FIG. 7 is a plan view of a first gear and a second gear as viewed in an +X direction.

FIG. 5 is a cross-sectional view showing a structure of the speed reducer 300. FIG. 6 is an exploded cross-sectional view showing a part of the speed reducer 300. FIG. 7 is a plan view of a first gear 310 and a second gear 320 provided in the speed reducer 300 as viewed in the +X direction. In the cross-sectional views shown in FIG. 5 and subsequent figures, hatching in each cross section is omitted as appropriate. The cross section shown in FIG. 5 shows a cross section in a direction different from that of the cross section shown in FIG. 2. FIG. 5 shows a state in which a material passage 31 communicating with the hopper 30 extends in the +Z direction. The speed reducer 300 in the embodiment is a concentric shaft type speed reducer in which an input shaft and an output shaft are on the same axis.

The speed reducer 300 includes a substantially cylindrical eccentric body 301 fixed to an output shaft 119 of the driving motor 118, the first gear 310 configured as a planetary gear, and the second gear 320 configured as a sun internal gear.

An end portion of the eccentric body 301 on a driving motor 118 side is pivotally supported by a first ball bearing 341 fixed to the screw case 101. An end portion of the eccentric body 301 on a screw 111 side is pivotally supported by a second ball bearing 342 press-fitted to an inner periphery of the second gear 320. An outer periphery of a portion of the eccentric body 301 that is fixed to the first ball bearing 341 and an outer periphery of a portion of the eccentric body 301 that is fixed to the second ball bearing 342 have a circular shape centered on the output shaft of the driving motor 118. On the other hand, a portion of the eccentric body 301 that is sandwiched between the first ball bearing 341 and the second ball bearing 342 has a circular shape having a center axis eccentric with respect to the output shaft of the driving motor 118. In the following description, the term "eccentric body 301" simply refers to the portion of the eccentric body 301 that is sandwiched between the first ball bearing 341 and the second ball bearing 342.

The first gear 310 has an annular shape, and a needle bearing 344 is press-fitted and fixed to an inner peripheral portion. As shown in FIG. 7, wavy external teeth 311 are formed on the outer periphery of the first gear 310. On the first gear 310, a plurality of pins 312 are disposed at equal intervals in a peripheral direction as viewed in the +X direction. Each of the pins 312 is disposed in a pin receiving recess portion 303. As shown in FIG. 6, a plurality of pin receiving recess portions 303 are formed in an annular pin receiving portion 302 fixed to the screw case 101 around the eccentric body 301. As shown in FIG. 7, each of the pin receiving recess portions 303 is open toward a +X direction side, and has a diameter larger than a diameter of the pin 312. Therefore, the pin 312 can move in the Y direction and the Z direction which are directions perpendicular to the rotation axis RX in the pin receiving recess portion 303.

As shown in FIG. 5, the second gear 320 has a bottomed cylindrical shape whose end surface on a -X direction side is open. A first recess portion 321 is formed in the end surface of the second gear 320 on the -X direction side, and a second recess portion 323 is further formed in a bottom portion of the first recess portion 321. The first gear 310 is accommodated in the first recess portion 321. Wavy internal teeth 322 with which the external teeth 311 of the first gear 310 shown in FIG. 7 come into contact are formed on an inner periphery of the first recess portion 321. The second ball bearing 342 that pivotally supports the end portion of the eccentric body 301 on the +X direction side is press-fitted and fixed to the second recess portion 323.

A hollow 206 is formed in an end surface of the screw 111 on the -X direction side, and a bottom portion 328 of the second gear 320 is fitted into the hollow 206. The hollow 206 and the bottom portion 328 are subjected to idling prevention processing such as D-cut processing. The screw 111 is fixed to the bottom portion 328 of the second gear 320 by a bolt 324 as a fixing portion in a direction of the rotation axis RX. That is, the screw 111 is integrated with the second gear 320. Therefore, when the second gear 320 moves along the rotation axis RX, the screw 111 moves along the rotation axis RX accordingly. The second gear 320 and the screw 111 may be fixed to each other by other fixing portions such as rivets, not limited to the bolt 324. Further, the number of bolts 324 is not limited to one, and a plurality of bolts 324 may be used to fix the second gear 320 and the screw 111 to each other. Hereinafter, the screw 111 rotated by the driving motor 118 and the speed reducer 300, particularly, the second gear 320 of the speed reducer 300 are also referred to as a "rotary body 125".

A flange-shaped first regulating portion 325 is formed on the outer periphery of the second gear 320. Details of the first regulating portion 325 will be described later. A portion of the second gear 320 on the -X direction side with respect to the first regulating portion 325 is pivotally supported by a third ball bearing 343 fixed to the screw case 101 on an outer peripheral side of the pin receiving portion 302. In the embodiment, the third ball bearing 343 is configured as a single-row angular bearing that receives a load in the -X direction from the screw 111.

An operation of the above-described speed reducer 300 will be described. When the driving motor 118 rotates, the eccentric body 301 fixed to the output shaft 119 of the driving motor 118 rotates. The eccentric body 301 partially contacts the needle bearing 344 provided on the inner periphery of the first gear 310 while rotating. When the eccentric body 301 comes into contact with the needle bearing 344, the first gear 310 receives a driving force from the eccentric body 301, and trembles in a Y-Z direction intersecting the rotation axis RX in a state where the pins 312 are accommodated in the pin receiving recess portions 303. Due to the movement of the first gear 310, the external teeth 311 of the first gear 310 partially and sequentially come into contact with the internal teeth 322 of the second gear 320, the second gear 320 rotates at a predetermined reduction ratio determined by the number of external teeth 311 of the first gear 310 and the number of internal teeth 322 of the second gear 320, and the screw 111 fixed to the second gear 320 rotates in the screw case 101 accordingly. In FIG. 6, a structure of the speed reducer 300 operating in this manner is shown in such a manner that a portion fixed to the screw case 101 and a portion moved by the driving force of the driving motor 118 are separated into upper and lower portions.

Figure 8:
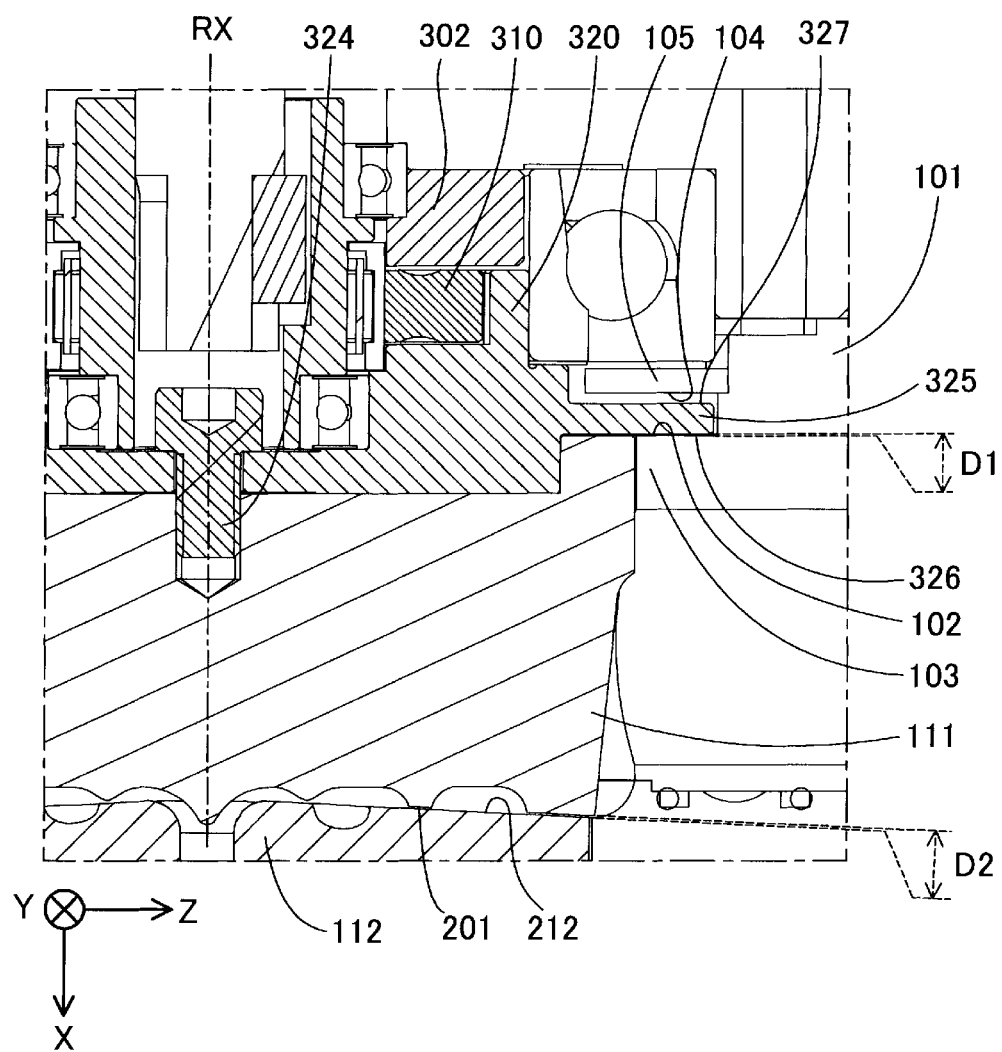
FIG. 8 is an enlarged cross-sectional view of a vicinity of a first regulating portion.

FIG. 8 is an enlarged cross-sectional view of a vicinity of the first regulating portion 325. As described above, the flange-shaped first regulating portion 325 is formed on the outer periphery of the second gear 320 serving as the rotary body 125. Since the screw 111 is fixed to the second gear 320, it can be said that the first regulating portion 325 is indirectly fixed to the screw 111.

The first regulating portion 325 has a first contact surface 326 facing a barrel 112 side, that is, the +X direction side. The screw case 101 includes a second regulating portion 103 having a second contact surface 102 facing the first contact surface 326. The second regulating portion 103 may be provided integrally with the screw case 101, or may be formed separately from the screw case 101 and joined to the screw case 101. The second contact surface 102 faces the first contact surface 326 in the direction of the rotation axis RX, and is contactable with the first contact surface 326. The term "contactable" means that either a non-contact state or a contact state can be achieved. The movement of the screw 111 along the rotation axis RX, more specifically, the movement of the screw 111 in the +X direction by a predetermined amount or more is regulated by the first regulating portion 325 and the second regulating portion 103.

The groove forming surface 201 of the screw 111 is spaced apart from the facing surface 212 by a predetermined interval in a state where the first contact surface 326 of the first regulating portion 325 and the second contact surface 102 of the second regulating portion 103 are in contact with each other. This interval is, for example, 0.1 mm. The interval between the groove forming surface 201 and the facing surface 212 refers to a shortest interval at a position where the groove 202 or the guide groove 211 is not formed.

Grease may be applied between the first contact surface 326 and the second contact surface 102 in order to reduce sliding resistance therebetween, and these surfaces may be subjected to low-friction coating with a fluorine resin or the like. Alternatively, the first regulating portion 325 or the second regulating portion 103 may be formed of a member having a low friction coefficient.

As described above, the screw 111 is fixed to the second gear 320 of the speed reducer 300 by the bolt 324. In the state where the first contact surface 326 and the second contact surface 102 are in contact with each other, the bolt 324 fixes the second gear 320 and the screw 111 to each other at a position where the groove forming surface 201 of the screw 111 is spaced apart from the facing surface 212 of the barrel 112 by the above-described interval. Therefore, in a state where the first contact surface 326 and the second contact surface 102 are not in contact with each other, the groove forming surface 201 of the screw 111 and the facing surface 212 of the barrel 112 are spaced apart from each other by an interval exceeding the above-described interval.

With the above configuration, a first distance D1 between the first contact surface 326 and the second contact surface 102 is smaller than a second distance D2 between the groove forming surface 201 of the screw 111 and the facing surface 212 of the barrel 112 regardless of the contact state between the first contact surface 326 and the second contact surface 102. During normal operations, that is, during generation of the plasticized material, the first distance D1 between the first contact surface 326 and the second contact surface 102 is, for example, 0.1 mm, and the second distance D2 between the groove forming surface 201 of the screw 111 and the facing surface 212 of the barrel 112 is, for example, 0.2 mm. When the first distance D1 and the second distance D2 are set as described above, even when the first contact surface 326 and the second contact surface 102 come into contact with each other, a gap of at least 0.1 mm is generated between the screw 111 and the barrel 112, and the screw 111 and the barrel 112 do not come into contact with each other. The second distance D2 is a distance at which the material supplied between the screw 111 and the barrel 112 can be plasticized, and is determined by performing experiments or simulations in advance.

FIG. 9 is a diagram showing experimental results for an optimum value of the first distance D1. In this experiment, the first distance D1 at an environmental temperature of 25° C. was set to 0.10 mm, 0.15 mm, 0.20 mm, 0.25 mm, and 0.30 mm, and operation sounds of the plasticizing device 110 were checked when a set temperature of the heater 113 was set to 100° C., 200° C., 300° C., 400° C., and 430° C. at each first distance D1. In FIG. 9, the check results are indicated by symbols "A", "B", and "C". The symbol A indicates that the operation sound is appropriate. The symbol B indicates that a large periodic sound was heard. The symbol C indicates that a large rubbing sound was heard. In this experiment, the screw 111, the second gear 320, and the screw case 101 respectively formed of SUS440C, which is a kind of martensitic stainless steel, were used as the screw 111, the second gear 320 including the first regulating portion 325, and the screw case 101 including the second regulating portion 103. The surface of the screw 111 was subjected to CrN coating, and had a diameter of 120 mm and a thickness of 29.7 mm. A rotation speed of the screw 111 was set to 95 rpm, which is a maximum rotation speed in a specification of the plasticizing device 110.

As shown in FIG. 9, when the first distance D1 at the environmental temperature of 25° C. was 0.10 mm and the set temperature was 400° C. and 430° C., evaluation results were "C". That is, under these conditions, a very large rubbing sound was heard from the plasticizing device 110. This is because the first regulating portion 325 provided in the rotary body 125 and the second regulating portion 103 provided in the screw case 101 thermally expand, the first distance D1 is excessively narrowed, and the first regulating portion 325 and the second regulating portion 103 come into contact and interfere with each other.

In addition, the evaluation results were "B" when the set temperature was 100° C., 200° C., and 300° C. in the case where the first distance D1 at the environmental temperature of 25° C. was 0.30 mm, and when the set temperature was 100° C. in the case where the first distance D1 at the environmental temperature of 25° C. was 0.25 mm. That is, under these conditions, a large periodic sound was heard from the plasticizing device 110. This is because the first distance D1 is not sufficiently reduced even when the first regulating portion 325 and the second regulating portion 103 thermally expand, rotation axis deflection occurs in the rotary body 125, and the periodic sound is generated.

According to the experimental results described above, a minimum value of the first distance D1 is preferably 0.15 mm at the environmental temperature of 25° C. A maximum value of the first distance D1 is preferably 0.25 mm, and more preferably 0.20 mm. When the first distance D1 satisfies such a condition, it is possible to prevent an occurrence of an abnormal sound from the plasticizing device 110 with the rotation of the rotary body 125. In addition, it is possible to prevent contact between the first regulating portion 325 and the second regulating portion 103, and thus it is possible to prevent an excessive load from being applied to the driving motor 118.

As shown in FIG. 8, in the embodiment, the first regulating portion 325 further includes a third contact surface 327 on an opposite side of the first contact surface 326 in the direction along the rotation axis RX. The screw case 101 includes a third regulating portion 105 having a fourth contact surface 104 that is contactable with the third contact surface 327. That is, in the embodiment, the first regulating portion 325 fixed to the screw 111 is disposed so as to be sandwiched between the second regulating portion 103 and the third regulating portion 105 provided in the screw case 101. The movement of the screw 111 in the −X direction by a predetermined amount or more is regulated by the third regulating portion 105 and the first regulating portion 325. A distance between the third contact surface 327 and the fourth contact surface 104 is set to, for example, a distance smaller than backlash of the third ball bearing 343 in the direction along the rotation axis RX. The third regulating portion 105 may be omitted.

Figure 10:
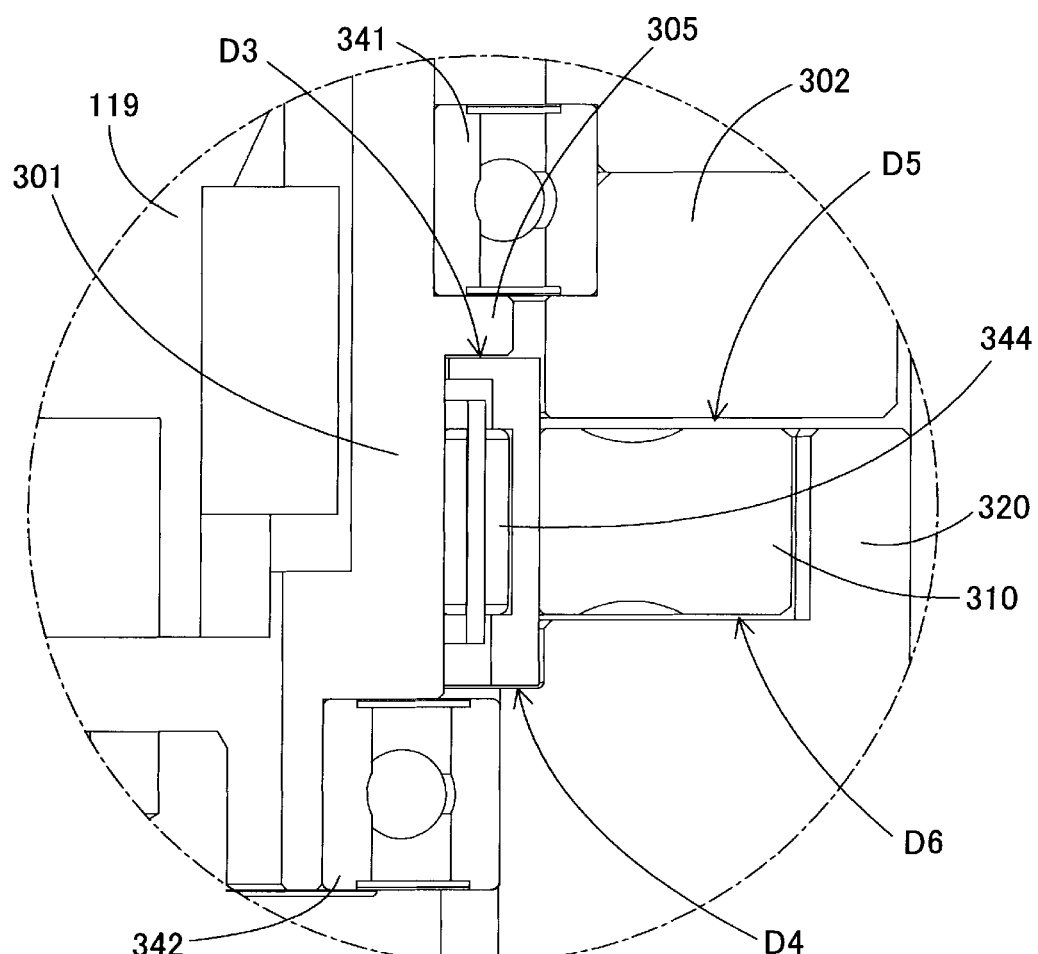
FIG. 10 is an enlarged cross-sectional view illustrating each interval between members.

FIG. 10 is an enlarged cross-sectional view illustrating each interval between members in the direction along the rotation axis RX. As shown in FIG. 10, a flange portion 305 is formed on the outer periphery of the eccentric body 301, and a third distance D3 between the flange portion 305 and the needle bearing 344 fixed to the first gear 310 is, for example, 0.1 mm. A fourth distance D4 between the needle bearing 344 and the second gear 320 is, for example, 0.1 mm. Further, a fifth distance D5 between the first gear 310 to which the needle bearing 344 is fixed and the pin receiving portion 302 is, for example, 0.5 mm, and a sixth distance D6 between the first gear 310 and the second gear 320 is, for example, 0.2 mm. That is, the third distance D3 and the fourth distance D4 are smaller than the sixth distance D6, and the fifth distance D5 is larger than the sixth distance D6. With such a distance relationship, contact of the first gear 310 with the second gear 320 can be prevented by reducing the interval between the needle bearing 344 and other members located above and below the needle bearing 344. Therefore, it is possible to prevent the first gear 310 and the second gear 320 from being worn.

According to the injection molding device 10 of the embodiment configured as described above, even when the screw 111 moves toward the barrel 112 side along the rotation axis RX, the first regulating portion 325 fixed to the screw 111 comes into contact with the second regulating portion 103 fixed to the screw case 101 before the screw 111 comes into contact with the barrel 112. Therefore, for example, even when the supply of the material from the hopper 30 is temporarily stopped or the material passage 31 is clogged with the material during continuous molding or the like, the screw 111 and the barrel 112 do not come into contact with each other, and for example, even when rattling in the direction along the rotation axis RX increases due to aging deterioration of the third ball bearing 343, the screw 111 and the barrel 112 do not come into contact with each other. Further, the screw 111 and the barrel 112 do not come into contact with each other even when the screw 111 idles during maintenance of the injection molding device 10, or the like. Therefore, according to the embodiment, the screw 111 is prevented from rotating in a state of being in contact with the barrel 112, and thus it is possible to prevent the screw 111 and the barrel 112 from being worn and durability from being lowered.

Further, in the embodiment, the speed reducer 300 and the screw 111 are fixed by the bolt 324 at the position where the screw 111 is spaced apart from the barrel 112 by a predetermined interval in the state where the first contact surface 326 and the second contact surface 102 are in contact with each other. Therefore, the screw 111 can be fixed to the speed reducer 300, so that the screw 111 and the barrel 112 do not come into contact with each other.

In the embodiment, since the screw 111 is fixed to the second gear 320 provided in the speed reducer 300, it is possible to more reliably prevent the screw 111 from coming into contact with the barrel 112.

Further, in the embodiment, since the first regulating portion 325 is provided on the second gear 320, it is possible to prevent the screw 111 from being worn due to the contact between the first regulating portion 325 and the second regulating portion 103. As a result, the durability of the screw 111 can be improved.

In the embodiment, regardless of the contact state between the first contact surface 326 and the second contact surface 102, the first distance D1 between the first contact surface 326 and the second contact surface 102 is smaller than the second distance D2 between the groove forming surface 201 of the screw 111 and the facing surface 212 of the barrel 112. Therefore, it is possible to more reliably prevent the screw 111 from coming into contact with the barrel 112.

In the embodiment, the first regulating portion 325 has the third contact surface 327 on the opposite side of the first contact surface 326, and the screw case 101 includes the third regulating portion 105 having the fourth contact surface 104 that is contactable with the third contact surface 327. Therefore, the screw 111 can be prevented from excessively moving toward the driving motor 118 side in the direction along the rotation axis RX. As a result, it is possible deterioration of plasticization performance of the material due to the movement of the screw 111 toward the driving motor 118 side.

B. Second Embodiment

Figure 11:
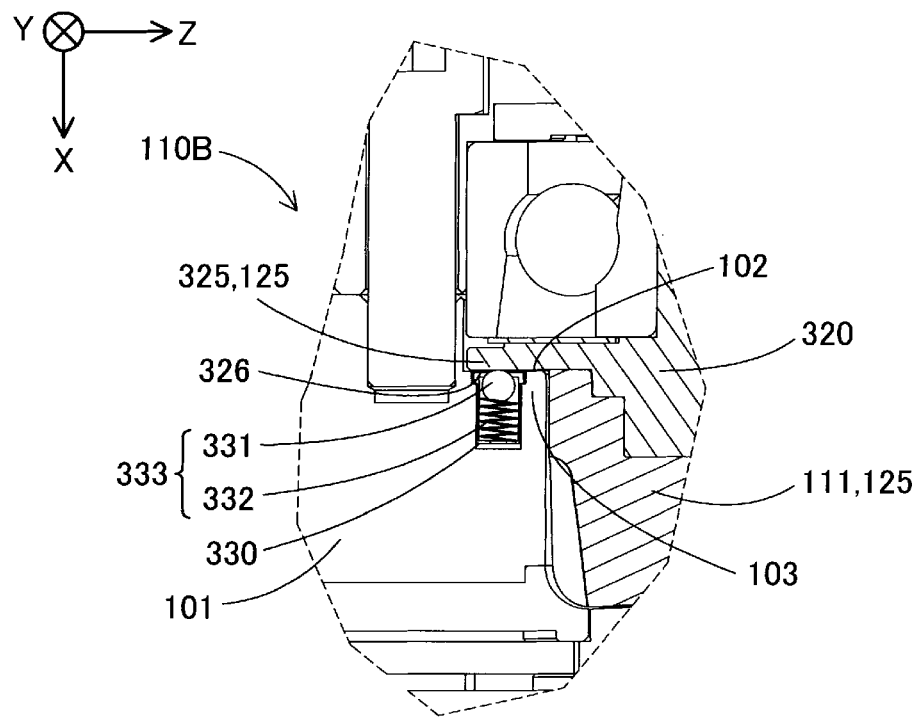
FIG. 11 is an enlarged cross-sectional view illustrating a structure of a plasticizing device according to a second embodiment.

FIG. 11 is an enlarged cross-sectional view illustrating a structure of a plasticizing device 110B according to a second embodiment. The plasticizing device 110B according to the second embodiment includes a biasing portion 333 that biases the rotary body 125 from the screw case 101 toward the rotary body 125.

As shown in FIG. 11, in the second embodiment, a hole portion 330 is formed in the second contact surface 102 of the second regulating portion 103 provided in the screw case 101. A spherical rotary member 331 and an elastic body 332 implemented by a coil spring are disposed in the hole portion 330. The rotary member 331 is biased by the elastic body 332 from the +X direction side toward the first regulating portion 325. The rotary member 331 and the elastic body 332 are referred to as the biasing portion 333. The biasing portion 333 may be implemented by, for example, a ball plunger or a press fit plunger. As shown in FIG. 11, in the embodiment, a part of the rotary member 331 of the biasing portion 333 is disposed between the first contact surface 326 and the second contact surface 102.

A hardness of the rotary member 331 is lower than a hardness of the rotary body 125. More specifically, the hardness of the rotary member 331 is lower than a hardness of the first regulating portion 325 of the rotary body 125 that contacts the rotary member 331. In the embodiment, the hardness refers to Vickers hardness (HV). The rotary member 331 is formed of, for example, austenitic stainless steel or aluminum alloy, and the first regulating portion 325 is formed of, for example, the martensitic stainless steel or high speed tool steel. By setting the hardness of the rotary member 331 to be lower than the hardness of the first regulating portion 325, the first regulating portion 325 is prevented from being worn, and the rotary member 331 is more easily worn as compared with the first regulating portion 325. Therefore, a cost required for the maintenance can be reduced by replacing the biasing portion 333 or the rotary member 331 as a consumable item, instead of replacing the rotary body 125 including the first regulating portion 325.

In the embodiment, a surface of the rotary body 125 is rougher than a surface of the rotary member 331. More specifically, a surface of the first regulating portion 325 of the rotary body 125 that contacts the rotary member 331 is rougher than the surface of the rotary member 331. Accordingly, it is possible to reduce friction of the rotary member 331 with respect to the first regulating portion 325, and it is possible to prevent the first regulating portion 325 from being worn. The roughness of the surface of the rotary member 331 can be reduced by, for example, polishing the surface of the rotary member 331.

Figure 12:
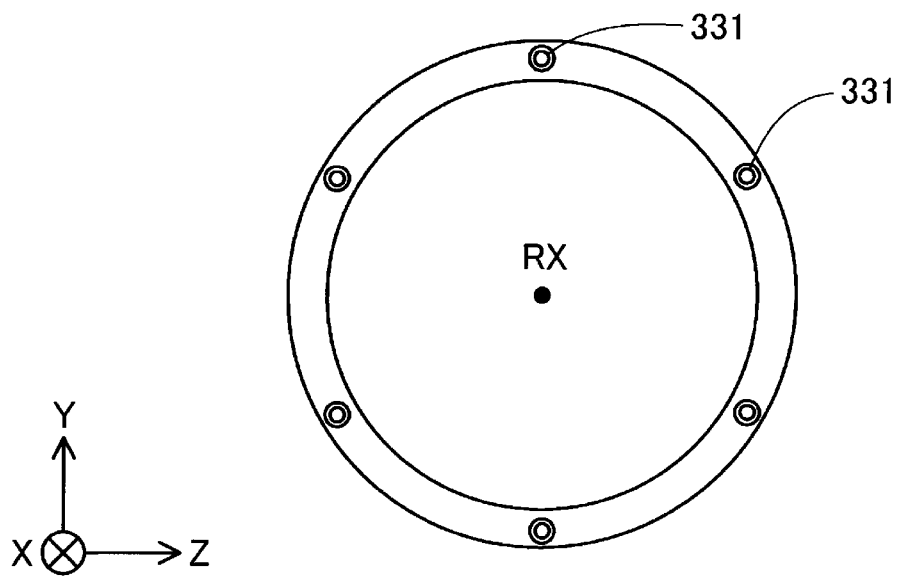
FIG. 12 is a plan view showing an arrangement of a rotary member.

FIG. 12 is a plan view showing an arrangement of the rotary member 331. As shown in FIG. 12, a plurality of rotary members 331 are provided around the screw 111 so as to be in contact with the first regulating portion 325 along a circumferential direction around the rotation axis RX. However, the rotary member 331 is not provided in a region overlapping the material passage 31 shown in FIG. 5 in the X direction.

According to the second embodiment described above, since the rotary member 331 is disposed between the first regulating portion 325 and the second regulating portion 103, sliding resistance between the first regulating portion 325 and the second regulating portion 103 can be reduced. Therefore, it is possible to prevent the abnormal sound from being generated from the plasticizing device 110B. According to the embodiment, since the rotary member 331 prevents the first regulating portion 325 from approaching the second regulating portion 103, it is possible to prevent the screw 111 from coming into contact with the barrel 112. Further, in the embodiment, since the rotary member 331 is biased toward the first regulating portion 325 by the elastic body 332, it is possible to more reliably prevent the screw 111 from coming into contact with the barrel 112. In addition, in the embodiment, since the plurality of rotary members 331 are provided along the circumferential direction around the rotation axis RX, it is possible to prevent an occurrence of rotation axis deflection in the screw 111.

In the embodiment, the biasing portion 333 is provided on the second regulating portion 103, but the biasing portion 333 may be provided on the first regulating portion 325. The number of rotary members 331 is not limited to plural, and only one rotary member 331 may be provided at any position. Further, the elastic body 332 is not necessary and may be omitted.

A shape of the rotary member 331 is not limited to the spherical shape, and may be a columnar shape or an annular shape that rotates about an axis radially extending from the rotation axis RX. For example, a thrust bearing may be used as the rotary member 331. In this case, an elastic member such as a disc spring may be disposed between the thrust bearing and the screw case 101 to bias the thrust bearing toward the first regulating portion 325.

In the embodiment, the hardness of the rotary member 331 is lower than the hardness of the rotary body 125, and the surface of the rotary body 125 is rougher than the surface of the rotary member 331. However, it is not necessary to satisfy both of these conditions, and only one of these conditions may be satisfied, or both of these conditions may not be satisfied.

C. Third Embodiment

Figure 13:
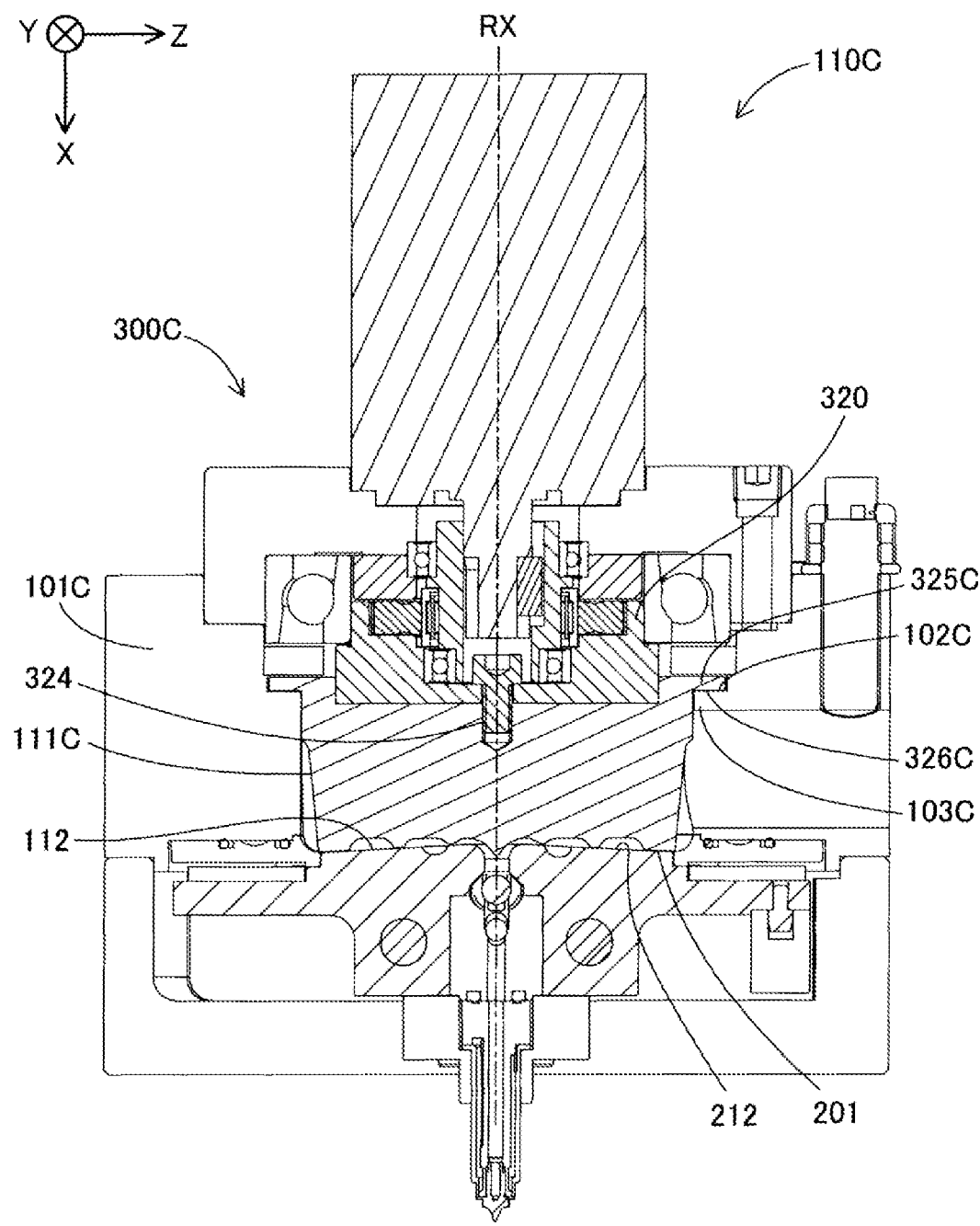
FIG. 13 is a cross-sectional view showing a schematic configuration of a plasticizing device according to a third embodiment.

FIG. 13 is a cross-sectional view showing a schematic configuration of a plasticizing device 110C according to a third embodiment. In the first embodiment described above, the first regulating portion 325 is provided on the second gear 320 of the speed reducer 300. Alternatively, in the third embodiment, a first regulating portion 325C is provided on a screw 111C, and is not provided on a speed reducer 300C.

In the embodiment, the bolt 324 serving as the fixing portion fixes the speed reducer 300C and the screw 111C at a position where a gap is formed between a first contact surface 326C of the first regulating portion 325C provided on the screw 111C and a second contact surface 102C of a second regulating portion 103C provided on a screw case 101C. This gap is, for example, 0.1 mm. In addition, when the above-described gap is formed between the first contact surface 326C and the second contact surface 102C, an interval between the groove forming surface 201 of the screw 111C and the facing surface 212 of the barrel 112 is larger than the above-described gap, and is, for example, 0.2 mm.

Also in the third embodiment configured as described above, as in the first embodiment, even when the first regulating portion 325C fixed to the screw 111C comes into contact with the second regulating portion 103C fixed to the screw case 101C accommodating the screw 111C, the screw 111C and the barrel 112 are spaced apart from each other with a predetermined interval therebetween. Therefore, the screw 111C is prevented from rotating in a state of being in contact with the barrel 112, and it is possible to prevent the screw 111 and the barrel 112 from being worn and the durability from being lowered.

In the embodiment, the bolt 324 fixes the speed reducer 300C and the screw 111C at the position where the gap is formed between the first contact surface 326C of the first regulating portion 325C and the second contact surface 102C of the second regulating portion 103C. Therefore, it is possible to more reliably prevent the screw 111C from coming into contact with the barrel 112.

Also in the third embodiment, as in the second embodiment, the biasing portion 333 may be provided between the first contact t surface 326C of the first regulating portion 325C and the second contact surface 102C of the second regulating portion 103C.

As in the third embodiment described above, when the first regulation portion 325C is provided on the screw 111C, the speed reducer 300C is not limited to a concentric shaft type speed reducer in which the input shaft and the output shaft are on the same axis, but may be a parallel shaft type speed reducer or an orthogonal shaft type speed reducer. Further, the screw 111C may be directly coupled to the driving motor 118 without using the speed reducer 300C.

D: Fourth Embodiment

Figure 14:
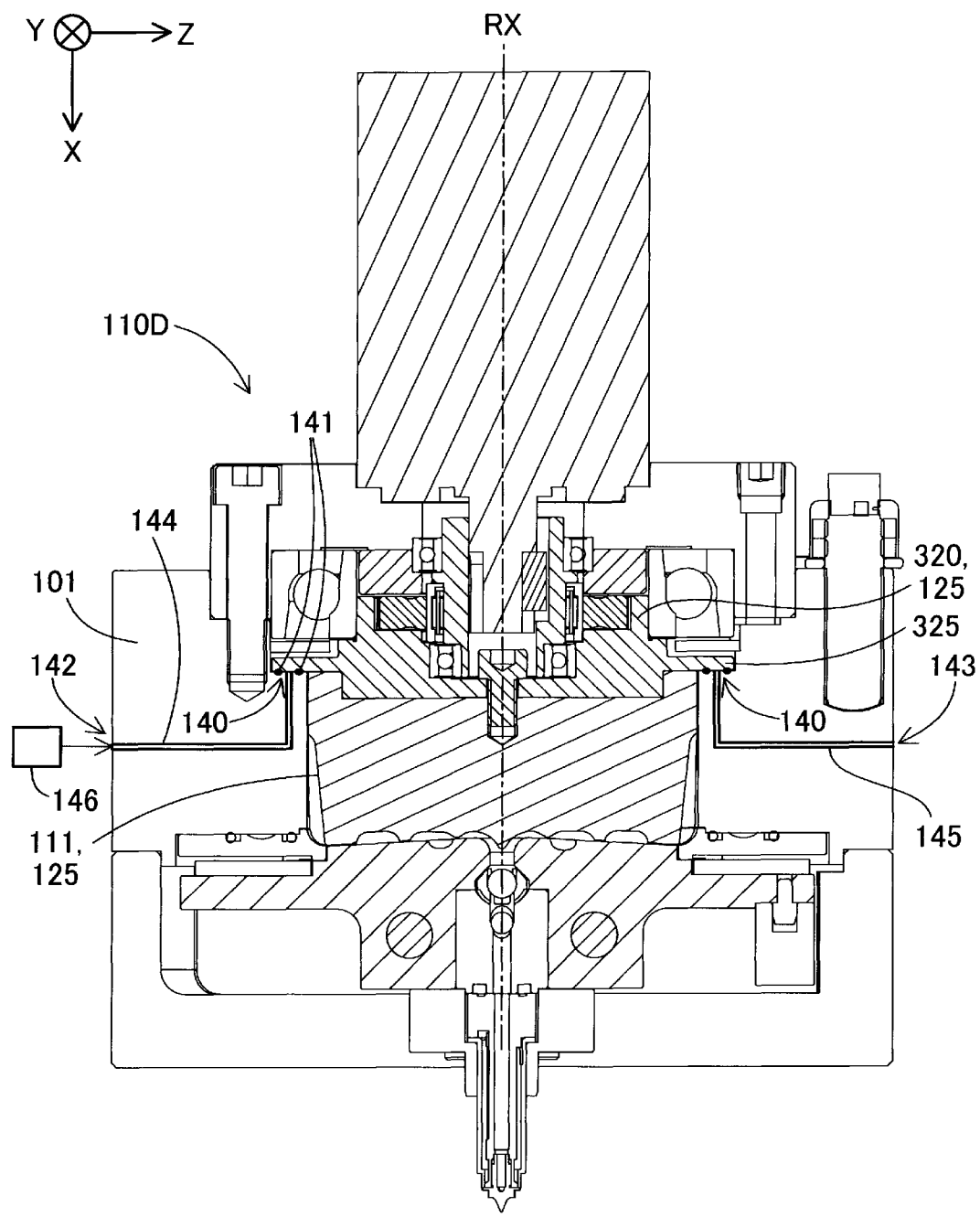
FIG. 14 is a cross-sectional view showing a schematic configuration of a plasticizing device according to a fourth embodiment.

FIG. 14 is a cross-sectional view showing a schematic configuration of a plasticizing device 110D according to a fourth embodiment. The plasticizing device 110B according to the second embodiment described above includes the biasing portion 333 that biases the rotary body 125 from the screw case 101 toward the rotary body 125. Alternatively, the plasticizing device 110D according to the fourth embodiment includes a sealing portion 140 that seals a fluid in a space between the screw case 101 and the rotary body 125. As the fluid, for example, air, water, or hydraulic oil is used.

In the sealing portion 140, O-rings 141 are disposed on an inner peripheral side and an outer peripheral side of the second contact surface 102 of the second regulating portion 103, respectively, and the space capable of sealing the fluid is defined between the first contact surface 326 and the second contact surface 102 by the O-rings 141. Grooves into which the O-rings 141 are fitted are formed in the second contact surface 102.

The plasticizing device 110D has an inlet portion 142 which communicates with the sealing portion 140 and through which the fluid flows into the sealing portion 140, and an outlet portion 143 through which the fluid in the sealing portion 140 flows to the outside. The inlet portion 142 communicates with the sealing portion 140 through an inlet flow path 144 formed in the screw case 101. The outlet portion 143 communicates with the sealing portion 140 through an outlet flow path 145 formed in the screw case 101. A pump 146 for causing the fluid to flow into the sealing portion 140 is coupled to the inlet portion 142. The pump 146 is controlled by the control unit 500. The control unit 500 controls the pump 146 to adjust a pressure and a flow rate of the fluid flowing into the sealing portion 140, so that a biasing force with which the sealing portion 140 biases the rotary body 125 can be adjusted. The pump 146 may be coupled to the outlet portion 143 instead of the inlet portion 142.

According to the fourth embodiment described above, as in the second embodiment, it is possible to reduce the sliding resistance between the first regulating portion 325 and the second regulating portion 103, and thus it is possible to prevent the abnormal sound from being generated from the plasticizing device 110D. Since the sealing portion 140 prevents the first regulating portion 325 from approaching the second regulating portion 103, it is possible to prevent the screw 111 from coming into contact with the barrel 112. Further, since the first regulating portion 325 is biased in the −X direction by the sealing portion 140, it is possible to more reliably prevent the screw 111 from coming into contact with the barrel 112. In addition, since the first regulating portion 325 is uniformly biased by the fluid sealed in the sealing portion 140, it is possible to prevent the occurrence of the rotation axis deflection in the screw 111.

E. Fifth Embodiment

Figure 15:
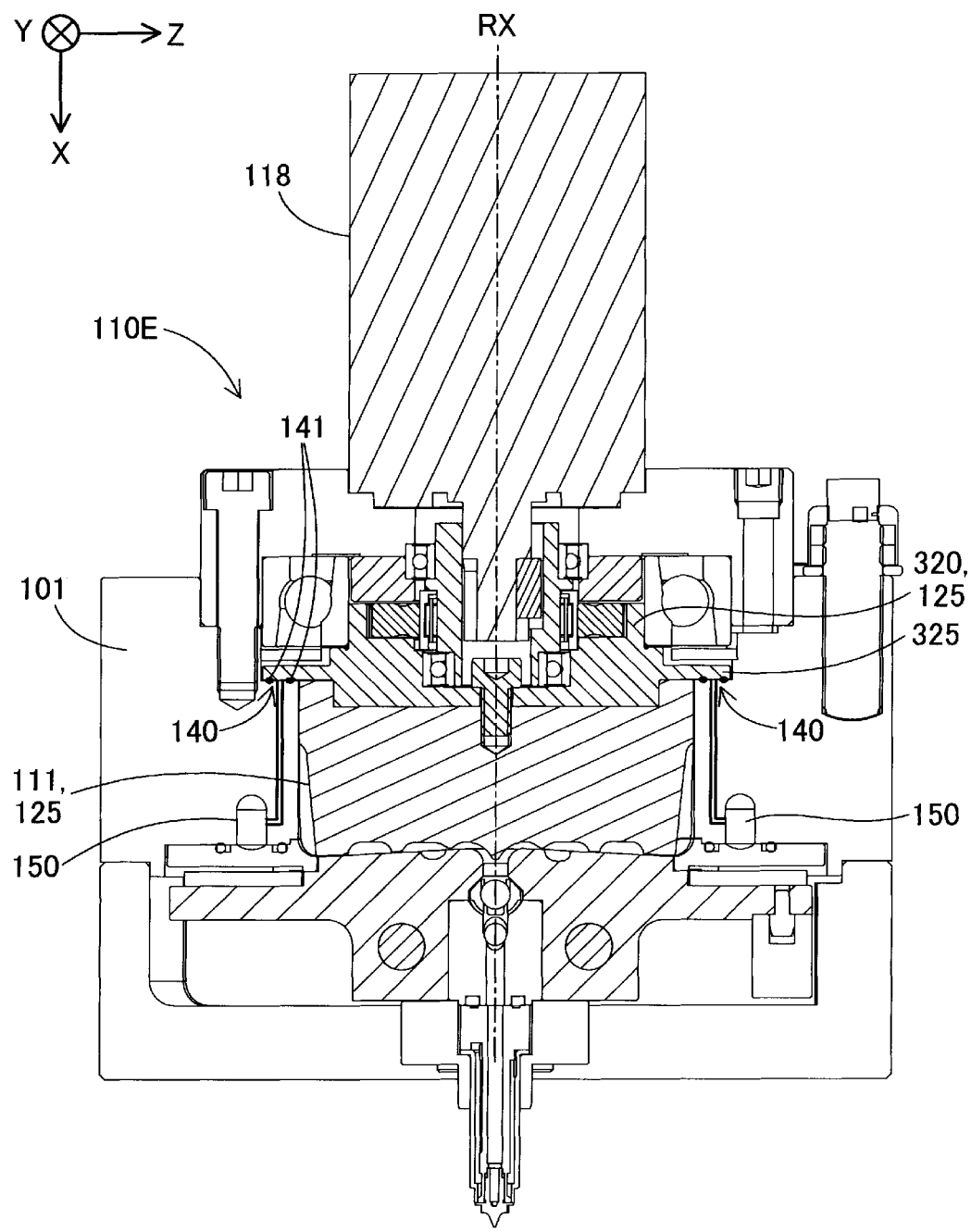
FIG. 15 is a cross-sectional view showing a schematic configuration of a plasticizing device according to a fifth embodiment.

FIG. 15 is a cross-sectional view showing a schematic configuration of a plasticizing device 110E according to a fifth embodiment. In the plasticizing device 110D according to the fourth embodiment described above, the sealing portion 140 communicates with the inlet portion 142 and the outlet portion 143 through the inlet flow path 144 and the outlet flow path 145. Alternatively, in the plasticizing device 110E according to the fifth embodiment, the sealing portion 140 communicates with a cooling portion 150 that cools the screw 111.

The cooling portion 150 has a tubular structure formed in the screw case 101 in a manner of surrounding the screw 111. A fluid for cooling the screw 111 flows in the annular structure. As the fluid, various cooling medium can be used. The cooling portion 150 is coupled to, for example, a chiller disposed outside the plasticizing device 110E, and the fluid is supplied from the chiller.

According to the fifth embodiment described above, since the sealing portion 140 communicates with the cooling portion 150 for cooling the screw 111, the fluid for cooling the screw 111 can be commonly used as the fluid for biasing the rotary body 125. Therefore, the configuration of the plasticizing device 110E can be simplified.

In the fifth embodiment, the sealing portion 140 communicates with the cooling portion 150 for cooling the screw 111, but, for example, the sealing portion 140 may communicate with a cooling portion having a tubular structure in which a fluid for cooling the driving motor 118 that drives the screw 111 flows.

F. Sixth Embodiment

Figure 16:
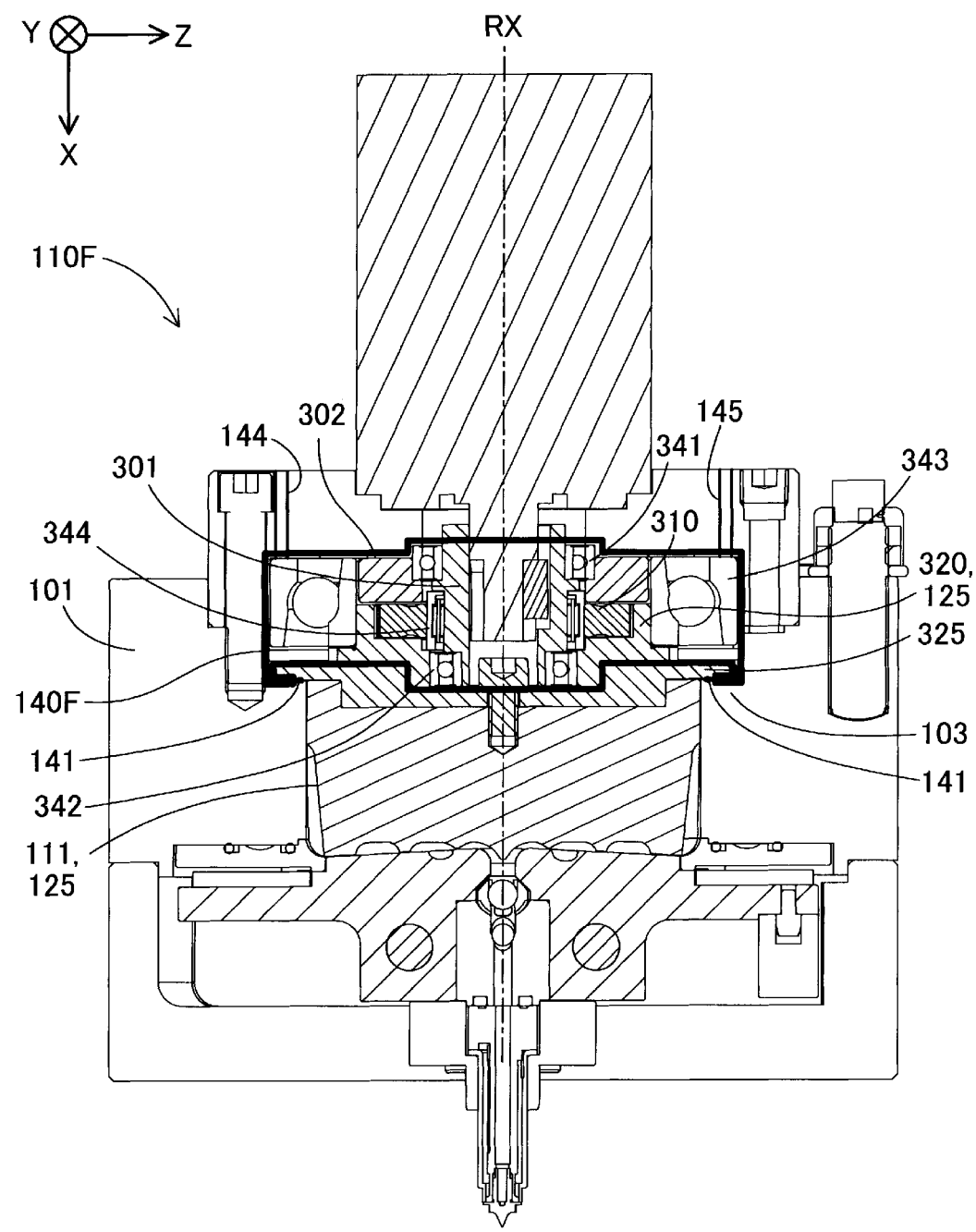
FIG. 16 is a cross-sectional view showing a schematic configuration of a plasticizing device according to a sixth embodiment.

FIG. 16 is a cross-sectional view showing a schematic configuration of a plasticizing device 110F according to a sixth embodiment. In the fourth and fifth embodiments described above, the sealing portion 140 is disposed between the first contact surface 326 of the first regulating portion 325 and the second contact surface 102 of the second regulating portion 103. Alternatively, in the plasticizing device 110F according to the sixth embodiment, the entire speed reducer 300 positioned closer to the driving motor 118 side as compared with the second gear 320 is included in a sealing portion 140F.

A range surrounded by a thick line in FIG. 16 represents a range of the sealing portion 140F. As shown in FIG. 16, the sealing portion 140F includes the first ball bearing 341, the second ball bearing 342, the third ball bearing 343, the needle bearing 344, the pin receiving portion 302, the first gear 310, the second gear 320, and the eccentric body 301. The O-ring 141 for defining the sealing portion 140F is disposed between the first regulating portion 325 and the second regulating portion 103. The inlet flow path 144 and the outlet flow path 145 are coupled to the sealing portion 140, and a fluid is supplied or discharged through the inlet flow path 144 and the outlet flow path 145 as in the fourth embodiment. In the embodiment, hydraulic oil is preferably used as the fluid.

According to the sixth embodiment described above, as in the second embodiment, it is possible to reduce the sliding resistance between the first regulating portion 325 and the second regulating portion 103, and thus it is possible to prevent the abnormal sound from being generated from the plasticizing device 110F. In addition, since the sealing portion 140F includes the entire rotary body 125 except for the screw 111, it is possible to prevent heat from being generated in the rotary body 125 and to favorably lubricate each portion.

G. Seventh Embodiment

Figure 17:
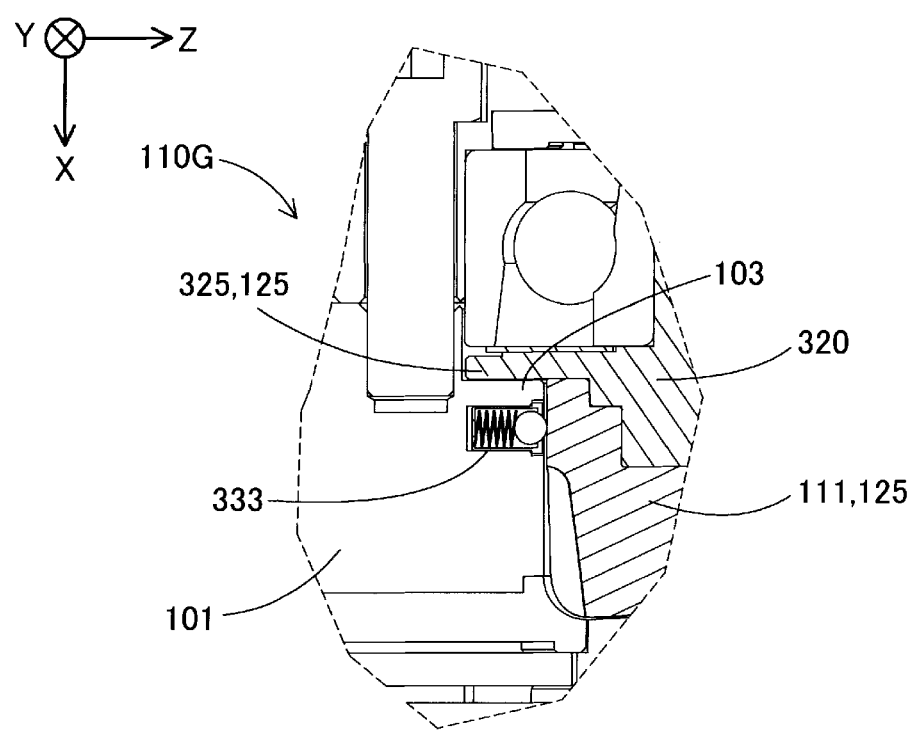
FIG. 17 is a cross-sectional view showing a schematic configuration of a plasticizing device according to a seventh embodiment.

FIG. 17 is a cross-sectional view showing a schematic configuration of a plasticizing device 110G according to a seventh embodiment. In the plasticizing device 110B according to the second embodiment described above, the biasing portion 333 is disposed between the first regulating portion 325 and the second regulating portion 103. Alternatively, in the seventh embodiment, the biasing portion 333 is disposed between a side surface of the screw 111 and the screw case 101. According to such a configuration, it is possible to prevent the occurrence of the rotation axis deflection in the screw 111, and it is possible to prevent an occurrence of an abnormal sound accompanying the rotation axis deflection.

Although FIG. 17 shows the example in which the biasing portion 333 is disposed between the side surface of the screw 111 and the screw case 101, the biasing portion 333 may be provided both between the first regulating portion 325 and the second regulating portion 103 and between the side surface of the screw 111 and the screw case 101.

Although FIG. 17 shows the example in which the biasing portion 333 is disposed between the side surface of the screw 111 and the screw case 101, the sealing portion 140 described in the fourth and fifth embodiments may be disposed between the side surface of the screw 111 and the screw case 101.

H. Eighth Embodiment

Figure 18:
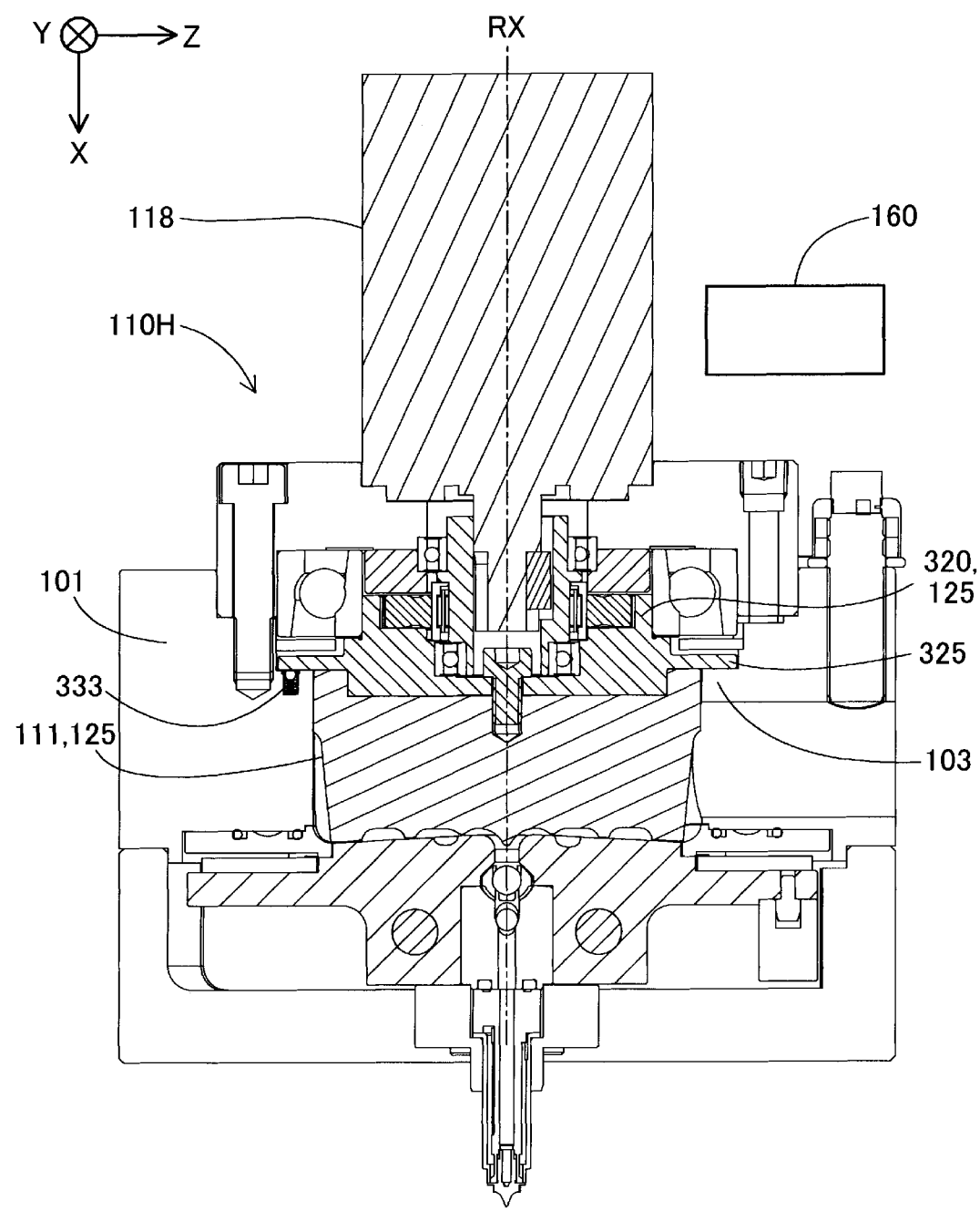
FIG. 18 is a cross-sectional view showing a schematic configuration of a plasticizing device according to an eighth embodiment.

FIG. 18 is a cross-sectional view showing a schematic configuration of a plasticizing device 110H according to an eighth embodiment. Similarly to the plasticizing device 110B according to the second embodiment, the plasticizing device 110H according to the eighth embodiment includes the biasing portion 333, and the plasticizing device 110H further includes a detection unit 160. The detection unit 160 is coupled to the control unit 500.

The detection unit 160 includes a sensor that detects a value related to the biasing force applied to the rotary body 125 by the biasing portion 333 from a torque value of the driving motor 118 and an operation sound or vibration of the plasticizing device 110H. As such a sensor, for example, a current sensor that measures the torque value of the driving motor 118, a sound sensor that measures a magnitude of the operation sound of the plasticizing device 110H, or a vibration sensor that measures a magnitude of the vibration can be used. When the biasing force applied to the rotary body 125 is large, a large torque needs to be applied to the driving motor 118, and thus a current value increases. Further, when the biasing force applied to the rotary body 125 is large, a frictional force between the rotary body 125 and the biasing portion 333 becomes large, and the operation sound and the vibration become large.

The control unit 500 acquires the value related to the biasing force applied to the rotary body 125 by the biasing portion 333 using the detection unit 160, and compares the value with a predetermined reference range. When the value related to the biasing force is out of the reference range, a user is notified of an error through a display device or a speaker.

In this manner, the plasticizing device 110H can detect whether the rotary body 125 is appropriately biased by the detection unit 160 detecting the value related to the biasing force applied to the rotary body 125. The detection of the biasing force performed by the detection unit 160 can detect a wear condition of the biasing portion 333 or the first regulating portion 325, and thus the user can be notified of the error and the user can be urged to replace members or perform the maintenance.

In the eighth embodiment, the plasticizing device 110H is provided with the biasing portion 333, but instead of the biasing portion 333, the sealing portion 140 described in the fourth to sixth embodiments may be provided. With such a configuration, the detection unit 160 can detect a biasing state of the sealing portion 140 to the rotary body 125.

Further, neither the biasing portion 333 nor the sealing portion 140 may be provided in the plasticizing device 110H. With such a configuration, the contact state between the first regulating portion 325 and the second regulating portion 103 can be detected by the detection unit 160.

I. Ninth Embodiment

Figure 19:
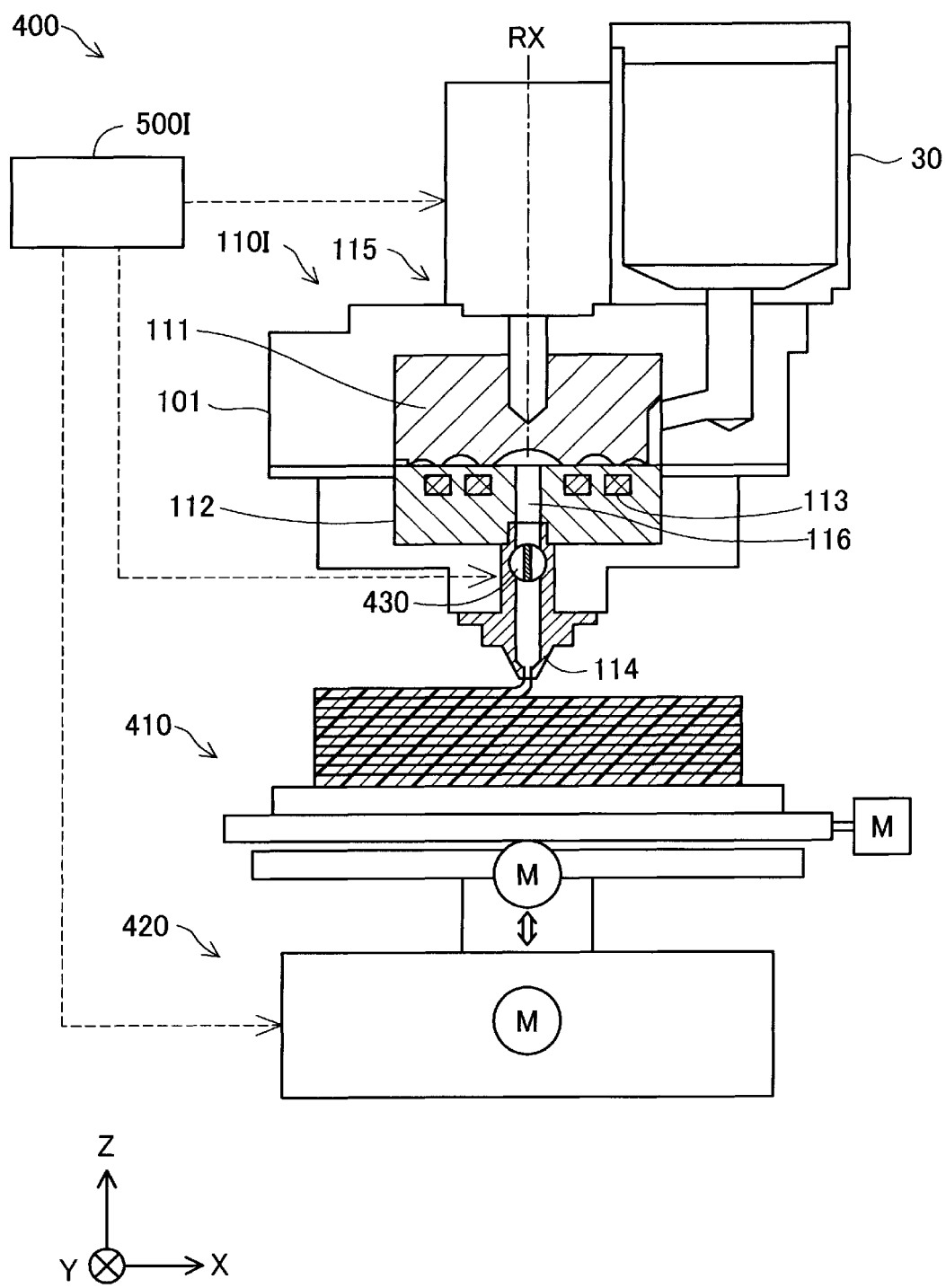
FIG. 19 is a cross-sectional view showing a schematic configuration of a three-dimensional shaping device according to a ninth embodiment.

FIG. 19 is a cross-sectional view showing a schematic configuration of a three-dimensional shaping device 400 according to a ninth embodiment. The three-dimensional shaping device 400 includes a plasticizing device 110I, a shaping table 410, a moving mechanism 420, and a control unit 500I.

The plasticizing device 110I has the screw 111, the barrel 112, the heater 113, and the nozzle 114. A configuration of the plasticizing device 110I is generally the same as any one of the plasticizing devices 110, 110B to 110H in the first to eighth embodiments. However, in the embodiment, a valve 430, which switches a discharge amount of the plasticized material from the nozzle 114 or whether the plasticized material is discharged, is provided between the communication hole 116 and the nozzle 114. The valve 430 is driven under control of the control unit 500I.

An upper surface of the shaping table 410 faces the nozzle 114. A three-dimensional shaped object is shaped on the shaping table 410. In the embodiment, the shaping table 410 is along a horizontal direction. The shaping table 410 is supported by the moving mechanism 420.

The moving mechanism 420 changes a relative position between the nozzle 114 and the shaping table 410. In the embodiment, the moving mechanism 420 changes the relative position between the nozzle 114 and the shaping table 410 by moving the shaping stage 410. The moving mechanism 420 in the embodiment is implemented by a three-axis positioner that moves the shaping table 410 in three axial directions of the X, Y, and Z directions by power generated by three motors. Each motor is driven under the control of the control unit 500I. The moving mechanism 420 may change the relative position between the nozzle 114 and the shaping table 410 by moving the plasticizing device 110I without moving the shaping table 410. Further, the moving mechanism 420 may change the relative position between the nozzle 114 and the shaping table 410 by moving both the shaping table 410 and the plasticizing device 110I.

Under the control of the control unit 500I, the three-dimensional shaping device 400 discharges the plasticized material from the nozzle 114 while changing the relative position between the nozzle 114 and the shaping table 410, thereby laminating a layer of the plasticized material on the shaping table 410 to shape a three-dimensional shaped object having a desired shape.

In the three-dimensional shaping device 400 according to the ninth embodiment described above, since the same plasticizing device as that of the first to eighth embodiments is provided as the plasticizing device 110I, it is possible to prevent an abnormal sound from being generated from the plasticizing device 110I.

J. Other Embodiments (1) The biasing portion 333 in the second and seventh embodiments described above biases the rotary member 331 with the elastic body 332. Alternatively, the biasing portion 333 may bias the rotary member 331 using various actuators such as a motor and a cylinder. In this case, the control unit 500 may adjust the interval between the barrel 112 and the screw 111 by controlling the biasing force of the biasing portion 333.

(2) In the fourth to sixth embodiments, the control unit 500 controls the pressure and the flow rate of the fluid flowing into the sealing portion 140, so that the biasing force of the sealing portion 140 may be controlled, and the interval between the barrel 112 and the screw 111 may be adjusted.

K. Other Forms

The present disclosure is not limited to the embodiments described above, and can be implemented in various forms without departing from the scope of the present disclosure. For example, technical features of the embodiments corresponding to technical features of the aspects described below can be appropriately replaced or combined in order to solve a part or all of the above problems or to achieve a part or all of the above effects. Technical features can be deleted as appropriate unless the technique features are described as essential in the present specification.

(1) According to a first aspect of the present disclosure, a plasticizing device is provided. The plasticizing device includes: a rotary body having a groove forming surface in which a groove is formed and having a screw configured to rotate; a barrel having a facing surface facing the groove forming surface and having a communication hole through which a plasticized material flows out to an outside; a heating unit configured to heat the material supplied to the groove; a screw case accommodating the screw; and a biasing portion configured to bias the rotary body from the screw case toward the rotary body and having a rotary member having a hardness lower than that of the rotary body at a tip end, or a sealing portion configured to seal a fluid in a space between the screw case and the rotary body.

With such an aspect, by the rotary member provided in the biasing portion biasing the rotary body, or by the sealing portion sealing the fluid in the space between the screw case and the rotary body, an appropriate interval can be set between the rotary body and the screw case. Therefore, it is possible to prevent an abnormal sound from being generated accompanying the rotation of the rotary body. Since the hardness of the rotary member provided in the biasing portion is lower than the hardness of the rotary body, it is possible to prevent the rotary body from being worn by the rotary member.

(2) In the above aspect, the rotary body may include a first regulating portion having a first contact surface facing a barrel side, the screw case may include a second regulating portion facing the first contact surface and having a second contact surface contactable with the first contact surface, and the biasing portion or the sealing portion may be provided between the first contact surface and the second contact surface. With such an aspect, an interval between the first regulating portion and the second regulating portion can be set to an appropriate interval by the biasing portion or the sealing portion.

(3) In the above aspect, the biasing portion or the sealing portion may be provided between a side surface of the screw and the screw case. With such an aspect, it is possible to prevent the abnormal sound from being generated accompanying the rotation of the rotary body.

(4) In the above aspect, the plasticizing device may further include a detection unit configured to detect a value related to a force biasing the rotary body. With such an aspect, it is possible to detect whether the rotary body is appropriately biased.

(5) In the above aspect, the plasticizing device may further include: the sealing portion; and a cooling portion configured to cool the screw or cool a driving motor causing the screw to rotate, in which the cooling portion may have a tubular structure in which the fluid flows, and the cooling portion and the sealing portion may be in communication. With such an aspect, the fluid used by the cooling portion and the fluid used by the sealing portion can be shared.

(6) In the above aspect, the plasticizing device may further include: the sealing portion, in which an inlet portion which communicates with the sealing portion and through which the fluid flows into the sealing portion, and an outlet portion through which the fluid in the sealing portion flows to an outside may be provided. With such an aspect, by adjusting a pressure and a flow rate of the fluid flowing into the inlet portion or the fluid flowing out of the outlet portion, a biasing force of the sealing portion can be easily adjusted.

(7) In the above aspect, a surface of the rotary body is rougher than a surface of the rotary member. With such an aspect, it is possible to prevent the rotary body from being worn.

(8) According to a second aspect of the present disclosure, a plasticizing device is provided. The plasticizing device includes: a rotary body having a groove forming surface in which a groove is formed and having a screw configured to rotate; a barrel having a facing surface facing the groove forming surface and having a communication hole through which a plasticized material flows out to an outside; a heating unit configured to heat the material supplied to the groove; and a screw case accommodating the screw, in which the rotary body includes a first regulating portion having a first contact surface facing a barrel side, the screw case includes a second regulating portion facing the first contact surface and having a second contact surface contactable with the first contact surface, and an interval between the first contact surface and the second contact surface is 0.15 mm or more and 0.25 mm or less at an environmental temperature of 25° C.

With such an aspect, the interval between the first contact surface and the second contact surface can be set to an appropriate interval, and thus it is possible to prevent the abnormal sound from being generated accompanying the rotation of the rotary body.

(9) A third aspect of the present disclosure is an injection molding device including the plasticizing device of the aspect described above and a nozzle configured to inject the plasticized material flowing out of the communication hole into a mold.

(10) A fourth aspect of the present disclosure is a three-dimensional shaping device including the plasticizing device of the aspect described above and a nozzle configured to discharge the plasticized material flowing out of the communication hole toward a shaping table.

What is claimed is:

1. A plasticizing device comprising:
   a rotary body having a groove forming surface in which a groove is formed and having a screw configured to rotate around a rotation axis, the rotary body being configured with a main part and a flange outwardly extending from the main part along a radial direction perpendicular to the rotation axis, the flange having a first contact surface extending along the radial direction;
   a barrel having a facing surface facing the groove forming surface and having a communication hole through which a plasticized material flows out to an outside;
   a heater configured to heat the material supplied to the groove;
   a screw case accommodating the screw, the screw case having a ledge, the ledge having a second contact surface extending along the radial direction, the first and second contact surfaces directly facing and aligning each other along the rotation axis; and
   one of a biasing portion and a sealing portion,
   wherein the biasing portion is configured to bias the rotary body from the screw case toward the rotary body and having a rotary member having a hardness lower than a hardness of the rotary body at a tip end of the biasing portion, and the biasing portion is provided in the ledge directly adjacent to the first contact surface, and
   the sealing portion is configured to seal a fluid in a space between the screw case and the rotary body, and the sealing portion is provided in the ledge directly adjacent to the first contact surface.

2. The plasticizing device according to claim 1, wherein the biasing portion or the sealing portion is provided between a side surface of the screw and the screw case.

3. The plasticizing device according to claim 1, further comprising:
a detection unit configured to detect a value related to a force biasing the rotary body.

4. The plasticizing device according to claim 1, further comprising:
a cooling portion configured to cool the screw or cool a driving motor causing the screw to rotate, wherein
the cooling portion has a tubular structure in which the fluid flows, and
the cooling portion is communication with the sealing portion.

5. The plasticizing device according to claim 1, further comprising:
an inlet portion which communicates with the sealing portion and through which the fluid flows into the sealing portion; and
an outlet portion through which the fluid in the sealing portion flows to an outside.

6. The plasticizing device according to claim 1, wherein a surface of the rotary body is rougher than a surface of the rotary member.

7. An injection molding device, comprising:
the plasticizing device according to claim 1; and
a nozzle configured to inject the plasticized material flowing out of the communication hole into a mold.

* * * * *